United States Patent
Aziz

(10) Patent No.: US 10,454,950 B1
(45) Date of Patent: Oct. 22, 2019

(54) CENTRALIZED AGGREGATION TECHNIQUE FOR DETECTING LATERAL MOVEMENT OF STEALTHY CYBER-ATTACKS

(71) Applicant: FireEye, Inc., Milpitas, CA (US)

(72) Inventor: Ashar Aziz, Coral Gables, FL (US)

(73) Assignee: FireEye, Inc., Milpitas, CA (US)

( * ) Notice: Subject to any disclaimer, the term of this patent is extended or adjusted under 35 U.S.C. 154(b) by 362 days.

(21) Appl. No.: 15/087,570

(22) Filed: Mar. 31, 2016

Related U.S. Application Data

(60) Provisional application No. 62/187,049, filed on Jun. 30, 2015.

(51) Int. Cl.
*H04L 29/06* (2006.01)

(52) U.S. Cl.
CPC ........ *H04L 63/1416* (2013.01); *H04L 63/145* (2013.01); *H04L 63/1441* (2013.01)

(58) Field of Classification Search
CPC ............. H04L 63/1416; H04L 63/1441; H04L 63/145

(Continued)

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

U.S. Appl. No. 15/087,476, filed Mar. 31, 2016 Final Office Action dated Sep. 13, 2018.

(Continued)

*Primary Examiner* — Taghi T Arani
*Assistant Examiner* — Badri Narayanan Champakesan
(74) *Attorney, Agent, or Firm* — Rutan & Tucker, LLP

(57) ABSTRACT

A centralized aggregation technique detects lateral movement of a stealthy (i.e., covert) cyber-attack in an enterprise network. A data center security (DCS) appliance may be located at a data center of the enterprise network, while a malware detection system (MDS) appliance may be located at a periphery of the network, an endpoint may be internally located within the enterprise network and an attack analyzer may be centrally located in the network. The appliances and endpoint may provide results of heuristics to an attack analyzer, wherein the heuristic results may be used to detect one or more tools downloaded to the endpoint, as well as resulting actions of the endpoint to determine whether the tools and actions manifest observable behaviors of the lateral movement of the SC-attack. The observable behaviors may include (i) unauthorized use of legitimate credentials obtained at the endpoint, as well as (ii) unusual access patterns via actions originated at the endpoint to acquire sensitive information stored on one or more servers on the network. The attack analyzer may then collect and analyze information related to the observable behaviors provided by the appliances and endpoint to create a holistic view of the lateral movement of the SC-attack.

50 Claims, 8 Drawing Sheets

(58) Field of Classification Search
USPC .......................................................... 726/23
See application file for complete search history.

(56) References Cited

U.S. PATENT DOCUMENTS

| | | | |
|---|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,321,338 B1 * | 11/2001 | Porras ................... H04L 41/142 |
| | | | 709/224 |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,704,874 B1 * | 3/2004 | Porras ................... H04L 41/142 |
| | | | 709/224 |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,752,665 B1 * | 7/2010 | Robertson ........... H04L 63/1458 |
| | | | 713/154 |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,024,804 B2 * | 9/2011 | Shulman ............. G06F 11/2257 |
| | | | 726/13 |
| 8,028,338 B1 | 9/2011 | Schneider et al. |
| 8,042,178 B1 | 10/2011 | Fisher et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,256,664 B1 * | 9/2012 | Balfanz ................. G06F 21/43 |
| | | | 235/375 |
| 8,260,914 B1 | 9/2012 | Ranjan |
| 8,266,091 B1 | 9/2012 | Gubin et al. |
| 8,271,978 B2 | 9/2012 | Bennett et al. |
| 8,286,251 B2 | 10/2012 | Eker et al. |
| 8,291,499 B2 | 10/2012 | Aziz et al. |
| 8,307,435 B1 | 11/2012 | Mann et al. |

(56) References Cited

U.S. PATENT DOCUMENTS

| | | |
|---|---|---|
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,407,798 B1 * | 3/2013 | Lotem .................. G06F 21/55 726/18 |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,286 B2 | 7/2013 | Dalcher et al. |
| 8,479,291 B1 | 7/2013 | Bodke |
| 8,479,292 B1 | 7/2013 | Linhardt |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,236 B2 | 8/2013 | Zimmer et al. |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,775,715 B2 | 7/2014 | Tsirkin et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,352 B2 | 9/2014 | Tsirkin et al. |
| 8,832,829 B2 | 9/2014 | Manni et al. |
| 8,839,245 B1 | 9/2014 | Khajuria et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,003,402 B1 | 4/2015 | Carbone et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,092,625 B1 | 7/2015 | Kashyap et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,203,862 B1 | 12/2015 | Kashyap et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,270,670 B1 * | 2/2016 | Fitzgerald ............ H04L 63/083 |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 * | 4/2016 | Manni ................ H04L 63/1433 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,614 B2 * | 9/2016 | Herz .................... G06Q 20/201 |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 * | 5/2017 | Neumann ............ H04L 63/1416 |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |

(56) References Cited

U.S. PATENT DOCUMENTS

| | | |
|---|---|---|
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,866,576 B2 * | 1/2018 | Ahn .................... H04L 63/0263 |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,044,675 B1 * | 8/2018 | Ettema ................ H04L 63/0227 |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0120856 A1 | 6/2003 | Neiger et al. |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0098623 A1 * | 5/2004 | Scheidell ............. G06F 21/552 726/23 |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0193943 A1 * | 9/2004 | Angelino ............ H04L 63/1408 714/4.1 |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0250124 A1 * | 12/2004 | Chesla ................. G06F 21/552 726/13 |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0010821 A1 * | 1/2005 | Cooper ................. H04L 63/102 726/4 |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0060562 A1 * | 3/2005 | Bhattacharya ...... H04L 63/1416 726/26 |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0216759 A1 | 9/2005 | Rothman et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |

(56) References Cited

U.S. PATENT DOCUMENTS

| | | |
|---|---|---|
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0130060 A1 | 6/2006 | Anderson et al. |
| 2006/0137012 A1 | 6/2006 | Aaron |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0195905 A1* | 8/2006 | Fudge .................. G06F 11/008 726/25 |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248528 A1 | 11/2006 | Oney et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0180454 A1 | 8/2007 | Fujimoto et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0300227 A1 | 12/2007 | Mall et al. |
| 2008/0018122 A1 | 1/2008 | Zierler et al. |
| 2008/0028124 A1 | 1/2008 | Tago |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0065854 A1 | 3/2008 | Schoenberg et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0244206 A1 | 10/2008 | Heo et al. |
| 2008/0263665 A1 | 10/2008 | Ma et al. |
| 2008/0294808 A1 | 11/2008 | Mahalingam et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0073895 A1 | 3/2009 | Morgan et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0106754 A1 | 4/2009 | Liu et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172661 A1 | 7/2009 | Zimmer et al. |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0282478 A1* | 11/2009 | Jiang .................. H04L 63/1416 726/22 |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0023810 A1 | 1/2010 | Stolfo et al. |
| 2010/0030996 A1 | 2/2010 | Butler, II |
| 2010/0031093 A1* | 2/2010 | Sun .................. G06F 21/552 714/45 |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |

(56) References Cited

U.S. PATENT DOCUMENTS

| | | |
|---|---|---|
| 2010/0077481 A1 | 3/2010 | Polyakov et al. |
| 2010/0082513 A1* | 4/2010 | Liu .................... H04L 63/1458 706/46 |
| 2010/0083376 A1 | 4/2010 | Pereira et al. |
| 2010/0115621 A1 | 5/2010 | Staniford et al. |
| 2010/0122120 A1* | 5/2010 | Lin ...................... G06F 11/076 714/47.3 |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0192226 A1* | 7/2010 | Noel ...................... H04L 41/12 726/23 |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0254622 A1 | 10/2010 | Kamay et al. |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299665 A1 | 11/2010 | Adams |
| 2010/0299754 A1 | 11/2010 | Amit et al. |
| 2010/0306173 A1 | 12/2010 | Frank |
| 2011/0004737 A1 | 1/2011 | Greenebaum |
| 2011/0004935 A1 | 1/2011 | Moffie et al. |
| 2011/0025504 A1 | 2/2011 | Lyon et al. |
| 2011/0041179 A1 | 2/2011 | St Hlberg |
| 2011/0047542 A1 | 2/2011 | Dang et al. |
| 2011/0047544 A1 | 2/2011 | Yehuda et al. |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0153909 A1 | 6/2011 | Dong |
| 2011/0167422 A1 | 7/2011 | Eom et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0296412 A1 | 12/2011 | Banga et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0314559 A1* | 12/2011 | Jakobsson ............... G06F 21/36 726/28 |
| 2012/0023593 A1 | 1/2012 | Puder et al. |
| 2012/0047580 A1 | 2/2012 | Smith et al. |
| 2012/0054869 A1 | 3/2012 | Yen et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0174225 A1* | 7/2012 | Shyamsunder ....... G06F 21/566 726/24 |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0254995 A1 | 10/2012 | Sallam |
| 2012/0255002 A1 | 10/2012 | Sallam |
| 2012/0255015 A1 | 10/2012 | Sahita et al. |
| 2012/0255016 A1 | 10/2012 | Sallam |
| 2012/0255017 A1 | 10/2012 | Sallam |
| 2012/0255021 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0311708 A1 | 12/2012 | Agarwal et al. |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0031374 A1 | 1/2013 | Thom et al. |
| 2013/0036472 A1 | 2/2013 | Aziz |
| 2013/0047257 A1 | 2/2013 | Aziz |
| 2013/0055256 A1 | 2/2013 | Banga et al. |
| 2013/0074185 A1 | 3/2013 | McDougal et al. |
| 2013/0086684 A1 | 4/2013 | Mohler |
| 2013/0091571 A1 | 4/2013 | Lu |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0145471 A1 | 6/2013 | Richard et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0191924 A1 | 7/2013 | Tedesco et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0282776 A1 | 10/2013 | Durrant et al. |
| 2013/0291109 A1 | 10/2013 | Staniford et al. |
| 2013/0298243 A1 | 11/2013 | Kumar et al. |
| 2013/0305006 A1 | 11/2013 | Altman et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0333033 A1 | 12/2013 | Khesin |
| 2013/0346966 A1 | 12/2013 | Natu et al. |
| 2013/0347131 A1 | 12/2013 | Mooring et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0075558 A1 | 3/2014 | Ward et al. |
| 2014/0082730 A1* | 3/2014 | Vashist ............... H04L 63/1416 726/23 |
| 2014/0130158 A1 | 5/2014 | Wang et al. |
| 2014/0137180 A1 | 5/2014 | Lukacs et al. |
| 2014/0157405 A1* | 6/2014 | Joll .................... H04L 63/1425 726/22 |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |

(56) References Cited

U.S. PATENT DOCUMENTS

| | | |
|---|---|---|
| 2014/0189882 A1 | 7/2014 | Jung et al. |
| 2014/0230059 A1* | 8/2014 | Wang ............... H04L 63/1441 726/23 |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351810 A1 | 11/2014 | Pratt et al. |
| 2014/0351935 A1 | 11/2014 | Shao et al. |
| 2014/0379775 A1* | 12/2014 | Korangy ............ H04L 67/1002 709/201 |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0128274 A1* | 5/2015 | Giokas ............... H04L 63/1416 726/23 |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0229656 A1* | 8/2015 | Shieh ............... H04L 63/1408 726/22 |
| 2015/0244730 A1 | 8/2015 | Vu et al. |
| 2015/0295945 A1* | 10/2015 | Canzanese, Jr. .... G06F 9/45545 726/23 |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0028757 A1* | 1/2016 | Kruglick ............ H04L 63/1416 726/23 |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0323295 A1 | 11/2016 | Joram et al. |
| 2016/0335110 A1 | 11/2016 | Paithane et al. |
| 2017/0041329 A1* | 2/2017 | Gobel ................. H04L 63/145 |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/135192 A2 | 10/2012 |
| WO | 2012/145066 A1 | 10/2012 |
| WO | 2012/154664 A2 | 11/2012 |
| WO | 2012/177464 A1 | 12/2012 |
| WO | 2013/067505 A1 | 5/2013 |
| WO | 2013091221 A1 | 6/2013 |
| WO | 2013113532 A1 | 8/2013 |
| WO | 2014/004747 A2 | 1/2014 |

OTHER PUBLICATIONS

U.S. Appl. No. 15/087,476, filed Mar. 31, 2016 Non-Final Office Action dated Feb. 22, 2018.
"Common Criteria for Information Technology Security Evaluation Part 3: Security Assurance Components," Sep. 2012, Ver. 3.1 (CCMB-2012-09-003).
"Mining Specification of Malicious Behavior"—Jha et al, UCSB, Sep. 2007 https://www.cs.ucsb.edu/.about.chris/research/doc/esec07.sub.--mining.pdf-.
"Network Security: NetDetector—Network Intrusion Forensic System (NIFS) Whitepaper", ("NetDetector Whitepaper"), (2003).
"When Virtual is Better Than Real", IEEEXplore Digital Library, available at, http://ieeexplore.ieee.org/xpl/articleDetails.iso?reload=true&arnumber=990073, (Dec. 7, 2013).
Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye") (Sep. 2003).
Amiri Sani, Ardalan, et al. "I/O paravirtualization at the device file boundary." ACM SIGPLAN Notices 49.4 (2014), pp. 319-332.
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlaq Berlin Heidelberg, (2006), pp. 165-184.
Bayer, et al., "Dynamic Analysis of Malicious Code", J Comput Virol, Springer-Verlag, France., (2006), pp. 67-77.
Bias, Randy "Micro Virtual machines", Jul. 12, 2007, retrieved on line http://web.archive.org/web/20100920064755/http://cloudscalling.com/blog/c- loud-computing/technology/micro-virtual-machines, retrieved on Nov. 12, 2015, 2 Pages.
Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).
Bromium Corp, "Bromium vSentry, Defeat of the Unknown Attack," downloaded from http://www.bromium.com/sites/default/files/Bromium-Whitepaper-vSentr- y_2.pdf on Dec. 1, 2013, 11 pages.
Bromium Corp, "Bromium vSentry—Defeat the Unknown Attack," Oct. 10, 2013, 11 pages.
Bromium Corp, "Live Attack Visualization and Analysis, What does a Malware attack look like?" http://www.bromium.com/sites/default/files/Bromium%20LAVA%20WP_2.pdf on Dec. 1, 2013, 11 pages.
Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-S120.
Common Criteria for Information Technology Security Evaluation Part 3: Security Assurance Components, Sep. 2012, Ver. 3.1 (CCMB-2012-09-003), 233 pages.
Costa, M. , et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.
Distler, "Malware Analysis: An Introduction", SANS Institute InfoSec Reading Room, SANS Institute, (2007).

(56) References Cited

OTHER PUBLICATIONS

Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Gao, Debin, Michael K. Reiter, and Dawn Xiaodong Song. "On Gray-Box Program Tracking for Anomaly Detection." USENIX security symposium. 2004, 16 pages.
Garfinkel, Tal, and Mendel Rosenblum. "A Virtual Machine Introspection Based Architecture for Intrusion Detection." NDSS. 2003, 16 pages.
Gaurav Banga et al., "Trustworthy Computing for the Cloud-Mobile Era", IEEE Consumer Electronics Magazine, vol. 3, No. 4, pp. 31-39, Oct. 2, 2014.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heiser, Gernot, and Ben Leslie. "The OKL4 Microvisor: Convergence point of microkernels and hypervisors." Proceedings of the first ACM asia-pacific workshop on Workshop on systems. ACM, 2010, 5 pages.
Heng Yin et al, Panorama: Capturing System-Wide Information Flow for Malware Detection and Analysis, Research Showcase © CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Hofmeyr, Steven A., Stephanie Forrest, and Anil Somayaji. "Intrusion detection using sequences of system calls." Journal of computer security 6.3 (1998): 151-180.
Huang, Yih, et al. "Efficiently tracking application interactions using lightweight virtualization." Proceedings of the 1st ACM workshop on Virtual machine security. ACM, 2008, 9 pages.
Idika et al., A-Survey-of-Malware-Detection-Techniques, Feb. 2, 2007, Department of Computer Science, Purdue University.
Iqbal, Asif, Nayeema Sadeque, and Rafika Ida Mutia. "An overview of microkernel, hypervisor and microvisor virtualization approaches for embedded systems." Report, Department of Electrical and Information Technology, Lund University, Sweden 2110 (2009), 15 Pages.
Iqbal, et al.,—"An Overview of Microkernel, Hypervisor and Microvisor Virtualization Approaches for Embedded Systems," Department of Electrical and Information Technology, Lund University, Sweden, Aug. 26, 2013, 15 pages.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Jiang, Xuxian, Xinyuan Wang, and Dongyan Xu. "Stealthy malware detection through vmm-based out-of-the-box semantic view reconstruction." Proceedings of the 14th ACM conference on Computer and communications security. ACM, 2007, 11 pages.
Jones, Stephen T., Andrea C. Arpaci-Dusseau, and Remzi H. Arpaci-Dusseau. "Antfarm: Tracking Processes in a Virtual Machine Environment." USENIX Annual Technical Conference, General Track. 2006, 14 pages.
Kaeo, Merike, "Designing Network Security", ("Kaeo"), (Nov. 2003).
Kapravelos, Alexandros, et al. "Revolver: An Automated Approach to the Detection of Evasive Web-based Malware." USENIX Security Symposium. 2013, 16 pages.
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H., et al., "Autograph: Toward Automated, Distributed Worm Signature Detection", Proceedings of the 13th Usenix Security Symposium (Security 2004), San Diego, (Aug. 2004), pp. 271-286.
King, Samuel T., and Peter M. Chen. "SubVirt: Implementing malware with virtual machines." Security and Privacy, 2006 IEEE Symposium on. IEEE, 2006, 14 Pages.
King, Samuel T., et al., "Operating System Support for Virtual Machines", ("King"), (2003).
Kosoresow, Andrew P., and Steven A. Hofmeyr. "Intrusion detection via system call traces." IEEE software 14.5 (1997): 35-42.
Kreibich, C., et al., "Honeycomb-Creating Intrusion Detection Signatures Using Honeypots", 2nd Workshop on Hot Topics in Networks (HotNets-11), Boston, USA, (2003).
Kristoff, J., "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Laureano, Marcos, Carlos Maziero, and Edgard Jamhour. "Intrusion detection in virtual machine environments." Euromicro Conference, 2004. Proceedings. 30th. IEEE, 2004, 6 pages.
Levin, Thomas E., Cynthia E. Irvine, and Thuy D. Nguyen. Least privilege in separation kernels. Naval Postgraduate School Monterey CA Dept of Computer Science, 2006 8 pages.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., "'Analyzing and exploiting network behaviors of malware.'", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nguyen, Anh M., et al. "Mavmm: Lightweight and purpose built vmm for malware analysis." Computer Security Applications Conference, 2009. ACSAC'09. Annual. IEEE, 2009, 10 pages.
Nojiri, D., et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.—N-Version Antivirus in the Network Cloud, 17th USENIX Security Symposium USENIX Security '08 Jul. 28-Aug. 1, 2008 San Jose, CA.
PCT Notification of Transmittal of the International Search Report and the Written Opinion of the International Searching Authority, or the Declaration, International Searching Authority, International Application No. PCT/US2014/071847, dated Mar. 26, 2015, 16 pages.

(56) References Cited

OTHER PUBLICATIONS

PCT Notification of Transmittal of the International Search Report and the Written Opinion of the International Searching Authority, or the Declaration, International Searching Authority, International Application No. PCT/US2014/071879, dated Apr. 28, 2015, 12 pages.
PCT Notification of Transmittal of the International Search Report and the Written Opinion of the International Searching Authority, or the Declaration, International Searching Authority, International Application No. PCT/US2014/071923, dated Mar. 26, 2015, 13 pages.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Steinberg, Udo, and Bernhard Kauer. "NOVA: a microhypervisor-based secure virtualization architecture." Proceedings of the 5th European conference on Computer systems. ACM, 2010, 14 pages.
Stumpf, Frederic, et al. "An approach to a trustworthy system architecture using virtualization." Autonomic and trusted computing. Springer Berlin Heidelberg, 2007. 191-202, 12 pages.
Sun, Kun, et al. "SecureSwitch: BIOS-Assisted Isolation and Switch between Trusted and Untrusted Commodity OSes." George Mason Feb. 26, 2013, 15 pages.
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 14/929,821, filed Nov. 2, 2015 Advisory Action dated Apr. 8, 2019.
U.S. Appl. No. 14/929,821, filed Nov. 2, 2015 Final Office Action dated Jan. 17, 2019.
U.S. Appl. No. 14/929,821, filed Nov. 2, 2015 Non-Final Office Action dated Aug. 6, 2018.
U.S. Appl. No. 14/929,821, filed Nov. 2, 2015 Restriction Requirement dated Jan. 10, 2018.
U.S. Appl. No. 15/087,476, filed Mar. 31, 2016 Non-Final Office Action dated Mar. 20, 2019.
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Wojtczuk, Rafal. "Subverting the Xen hypervisor." Black Hat USA 2008 (2008), 9 pages.
Yan, Lok Kwong, et al. "Transparent and Extensible Malware Analysis by Combining Hardware Virtualization and Software Emulation." Internet Society, 2010. Downloaded from https://www.internersociety.org/sites/default/files/05_1.pdf, 1 page.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.
U.S. Appl. No. 15/473,154, filed Mar. 29, 2017 Final Office Action dated Apr. 29, 2019.
U.S. Appl. No. 15/473,154, filed Mar. 29, 2017 Non-Final Office Action dated Nov. 29, 2018.

\* cited by examiner

US 10,454,950 B1

CENTRALIZED AGGREGATION TECHNIQUE FOR DETECTING LATERAL MOVEMENT OF STEALTHY CYBER-ATTACKS

RELATED APPLICATION

The present application claims priority from commonly owned Provisional Patent Application No. 62/187,049, entitled CENTRALIZED AGGREGATION TECHNIQUE FOR DETECTING LATERAL MOVEMENT OF STEALTHY CYBER-ATTACKS, filed on Jun. 30, 2015, the contents of which are incorporated herein by reference.

BACKGROUND

Technical Field

The present disclosure relates to detection of stealthy (i.e., covert) cyber-attacks and, more specifically, to detection of lateral movement of covert attacks throughout a network.

Background Information

Stealthy (i.e., covert) cyber-attacks often make unauthorized use of legitimate credentials to persist undetected in a network and employ a variety of stealthy procedures and tools to initially gain a foothold into (i.e., infiltrate) the network, such as an enterprise network, via an end node, such as a desktop. Stealthy infiltration and use of legitimate credentials after infiltration allows the attack to persist undetected for a period of time. Subsequent to infiltrating the enterprise network, a stealthy cyber-attack may move laterally (i.e., attempt to obtain information from or move to another node) inside the network often towards a data center to target, e.g., intellectual property, military secrets and proprietary commercial or personal data (hereinafter "sensitive information"). Many traditional malware-based security architectures are unable to detect the lateral movement of an attack inside the enterprise network, as an attacker may employ tools and procedures characterized by stealthy infiltration into the network (e.g., by using phishing techniques or legitimate credentials) and low observability once in the network to target (i.e., gain access to) storage systems or servers of the data center. Once in the network, the stealthy cyber-attack may perform actions, such as credential cracking, to recover credentials (passwords) which may be used to legitimately access the data center servers and avoid simple detection that used traditional signature-based methods.

For example, the stealthy attack may involve passing (downloading) of an object (e.g., within the payload of one or more communication packets) over the Internet to the desktop of the enterprise network, wherein the object contains a cracking tool. The attacker may employ a conventional credential cracking tool in any of a variety of types of attacks, such as a dictionary attack, rainbow table, and brute-force attack. Subsequent processing of the object may compromise the desktop to download one or more password files from a server of the enterprise network. The cracking tool may then run on each password file to crack (decode and recover) a legitimate credential or password otherwise authorized to access the data center servers, without the use of malware or exploits (i.e., having low detectability). Accordingly, a system administrator managing the data center may be unable to detect a stealthy attack because the attacker may have legitimate (albeit stolen) credentials that enable legitimate (albeit unauthorized) login to the data center servers.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1A:
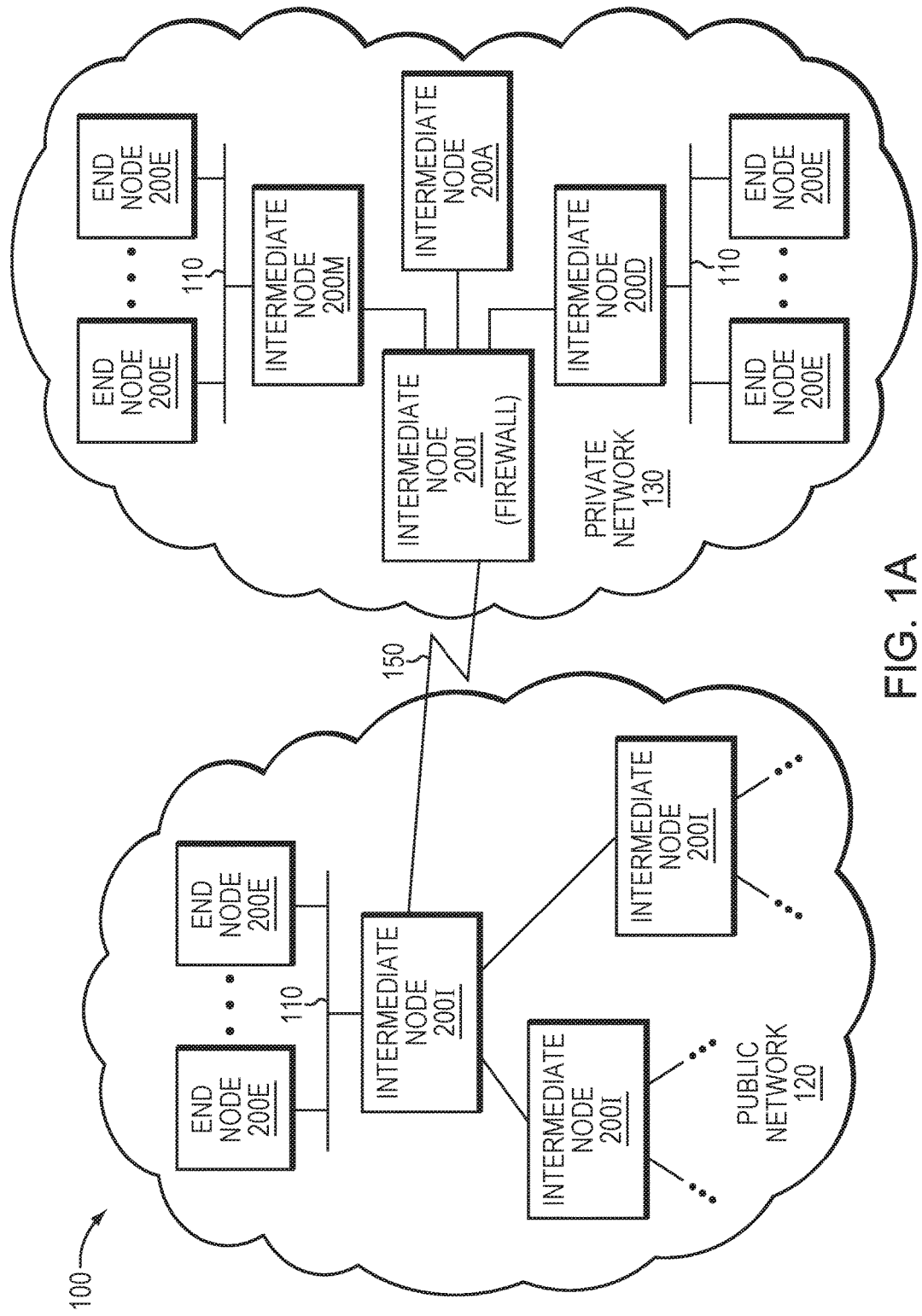
FIG. 1A is a block diagram of a network environment that may be advantageously used with one or more embodiments described herein.

Embodiments described herein provide a centralized aggregation technique for detecting lateral movement of a stealthy (i.e., covert) cyber-attack (SC-attack) in an enterprise network. An SC-attack may be detected by a centralized attack analyzer that correlates and analyses indicators of the attack received from separately located and cooperating detection sensors (i.e., nodes within the network configured to observe and report behaviors), which may each be configured as a purpose-built electronic device (e.g., appliance) or integrated into a more general-purpose electronic device or system. Specifically, a data center security (DCS) appliance may be located operationally at (proximate or within) a data center of the enterprise network, while a malware detection system (MDS) appliance may be located operationally at a periphery of the network, an endpoint (e.g., notebook, desktop or other computing device) may be internally located within the enterprise network and the attack analyzer may be centrally located in the network. The appliances (DCS and MDS) and endpoint may provide (i.e., report) results of heuristics to the attack analyzer, wherein the heuristics results may be used to detect that one or more objects contain a tool downloaded to the endpoint, as well as to detect actions (i.e., behaviors) resulting from operation of the tool so as to determine whether the tool and actions manifest observable behaviors of lateral movement of the SC-attack.

An externally launched SC-attack targeting a private network and using a credential cracking tool may occur in multiple phases. The phases may include: an initial movement into (i.e., "infiltration" of) the private network of a malicious kit (small package), a secondary download of a credential cracking tool, a credential gathering phase using the downloaded credential cracking tool, and a phase involving accessing sensitive information obtained within the private network. Illustratively, these phases often require lateral movement of the attack within the network.

In an embodiment, a centralized aggregation technique to detect such an SC-attack may involve some combination of (i) detecting download to an endpoint of a tool that may be used to perform credential stealing (e.g., when detected by the endpoint, called an end node-based indicator, and when detected by the MDS appliance, called a network-based indicator), (ii) detecting use of the tool by the endpoint (e.g., an additional end node-based indicator or a data center-based indicator), and (iii) detecting unusual patterns of credential use on the network (e.g., a data-center-based indicator). Accordingly, the combination of detected behaviors may indicate a likelihood of unauthorized use of legitimate credentials that denotes an SC-attack.

Illustratively, the observable behaviors may include any of the following: (i) the actual download of the tool, (ii) access to a stored credentials file (e.g., a stored record) within the data center, (iii) use of the tool by an endpoint with respect to contents of the credentials file to ascertain a set of credentials, (iv) unauthorized use of legitimate credentials obtained at the endpoint, as well as (v) unusual access patterns via actions originated at the endpoint to acquire, modify or delete sensitive information stored on one or more servers on the network (e.g., at the data center). The attack analyzer may collect and analyze information related to the observable behaviors provided by the appliances (DCS and MDS) and endpoint (e.g., end node-based and network-based indicators) to create a holistic (i.e., aggregated) view of the lateral movement of the SC-attack. In other words, the attack analyzer may combine the end node-based and network-based indicators from multiple (e.g., two or more) vantage points in the network to identify and declare that an SC-attack involving lateral movement is in progress on the network. Further, the attack analyzer may monitor progress of the SC-attack by detecting multiple lateral movements of the attack via continued collection and analysis of information provided by the appliances and endpoint (or endpoints) as to the observable behaviors of the on-going (i.e., continuing) SC-attack.

In an embodiment, the centralized attack analyzer may include an analysis engine that aggregates, analyzes, and correlates behaviors provided from the vantage points of, e.g., the network periphery via the MDS appliance (i.e., determining the network-based indicator), the internal network via the endpoint (i.e., determining the end node-based indicator), and the data center via the DCS appliance (i.e., determining the data center-based indicator), in accordance with a centralized aggregation technique to declare (e.g., issue an alert) that an SC-attack is in progress in the network. The end node-based indicator includes, e.g., identification of the credential cracking tool operating on the endpoint, while the data center-based indicator includes, e.g., observation of a large number of remote mounts by that endpoint to the data center. The attack analyzer may further be configured to continually observe and gather additional indicators (either end node-based or network-based) of the attack from other vantage points (e.g., other nodes, endpoints, sensors, and/or appliances) in the network to provide a holistic (i.e., aggregated) view of the attack lifecycle, i.e., track progress (further lateral movements) of the attack. For example, the attack analyzer may probe the network to determine whether the object containing the cracking tool has propagated nefarious operations to other nodes (e.g., endpoints), where the operations may manifest behaviors for performing, e.g., credential cracking, reconnaissance, and/or phishing, used to initiate unusual access patterns such as, e.g., remote mounts and/or data access requests, to the data center. Notably, in addition to (initially) identifying an SC-attack, the centralized aggregation technique may permit tracking of on-going (i.e., continuing) changes (e.g., further lateral movements) of the SC-attack throughout the attack lifecycle. That is, the centralized aggregation technique provides for tracking the on-going SC-attack, whether it remains unchanged or evolves (i.e., changes), throughout the attack lifecycle.

Advantageously, the technique leverages the locations and functions of the MDS appliance, the endpoint, and the DCS appliance to triangulate (i.e., process information from three or more vantage points) the observables (e.g., end node-based, network-based and data center-based indicators) from the different vantage points to detect lateral movement in the network of the SC-attacker. In other embodiments, two of these vantage points may be sufficient to detect the attack. The combination of the observable indicators, e.g., detection of a cracking tool downloaded to the endpoint (end node-based indicator) and a large number of remote mounts to a data center server from that endpoint (data center-based indicator), provide visibility into (i.e., an overview of) the SC-attack that infiltrates the enterprise network. In other words, the views from multiple vantage points may be combined to determine that an SC-attack is currently underway in the enterprise network. Accordingly, detection of the lateral movement of an SC-attack may uncover (i.e., reveal) the attack and provide valuable information for use in tracing the attack, limiting and remediating the consequences of the attack, as well as preventing (i.e., block) similar future attacks from occurring on the same or another network.

In other embodiments, the secondary download may contain a type of tool different from a credential cracking tool, yet have observable behaviors that produce indicators to allow identification of lateral movement of an attack and thus the attack itself. For example, the attack may involve a reconnaissance tool used to survey data records within the data center to report on the types and locations of the records for later targeted access (e.g., malicious data modification, deletion or theft). In addition, the attack may involve a surveillance tool used to monitor on going activity within the network or specific portions of the network, such as the data center. In such a case, 1) the MDS appliance may detect the download into the network of the (surveillance) tool, 2) the endpoint may detect operation of the tool, 3) the DCS appliance may detect anomalous activity within the data center, and 4) the MDS appliance may detect a "callback" (outbound communication attempt) from the endpoint to transmit acquired information (exfiltrate) or seek further instructions from an external malicious server.

The technique described herein may detect the SC-attack using the combination of all or some of the described indicators (e.g., end node-based, network-based, data-center based indicators) although, often, only a sub-set of the indicators are detectable. For example, some malicious behaviors may appear innocent in and of themselves and thus go undetected, while others may be cloaked to avoid detection. Accordingly, an embodiment having all of the above-described vantage points may provide a least (i.e., minimal) amount of indicator detection essential to determine whether any SC-attack is taking place. Notably, in many attack scenarios, using only one or two of these vantage points may miss detection of the attack that may be correctly identified using at least three vantage points. However, for some attack scenarios, two vantage points may suffice to correctly detect the attack. Moreover, different behaviors indicating the attack may be observed in the combination of the described appliances and a plurality of different endpoints (or other nodes) that are distributed (i.e., having additional vantage points) throughout the network. As such, some embodiments may issue alerts regarding the occurrence of an SC-attack with a higher level of confidence so as to avoid false positives and false negatives in identifying such attacks.

DESCRIPTION

FIG. 1A is a block diagram of a network environment 100 that may be advantageously used with one or more embodiments described herein. The network environment 100 illustratively includes a plurality of networks organized as a public network 120, such as the Internet, and a private network 130, such as an organization or enterprise (e.g., customer) network. The networks 120, 130 illustratively include a plurality of network links and segments connected to a plurality of nodes 200. The network links and segments may include local area networks (LANs) 110 and wide area networks (WANs) 150, including wireless networks, interconnected by intermediate nodes $200_I$ to form an internetwork of nodes, wherein the intermediate nodes $200_I$ may include network switches, routers and/or malware detection system (MDS) and data center security (DCS) appliances as well as an attack analyzer appliance ("attack analyzer") (intermediate nodes $200_{M,D,A}$ respectively) described further herein. As used herein, an appliance may be embodied as any type of general-purpose or special-purpose computer, including a dedicated electronic computing device, adapted to implement a variety of software architectures relating to, inter alia, exploit and malware detection functionality, as well as attack detection functionality as described herein. The term "appliance" should therefore be taken broadly to include such arrangements, in addition to any systems or subsystems configured to perform a management function for such detection, and associated with other equipment or systems, such as a network computing device interconnecting the WANs and LANs. The LANs 110 may, in turn, interconnect end nodes $200_E$ which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent, general-purpose or special-purpose electronic device having network connectivity and, particularly for some embodiments, that may be configured to implement a virtualization system. The nodes 200 illustratively communicate by exchanging packets or messages (i.e., communication traffic) according to a predefined set of protocols, such as the Transmission Control Protocol/Internet Protocol (TCP/IP); however, it should be noted that other protocols, such as the HyperText Transfer Protocol Secure (HTTPS), may be advantageously used with the embodiments herein. In the case of private network 130, the intermediate node $200_I$ may include a firewall or other network device configured to limit or block certain communication (network) traffic in an attempt to protect the endpoints from unauthorized users. Unfortunately, such conventional attempts often fail to protect the endpoints, which may be compromised.

Figure 1B:
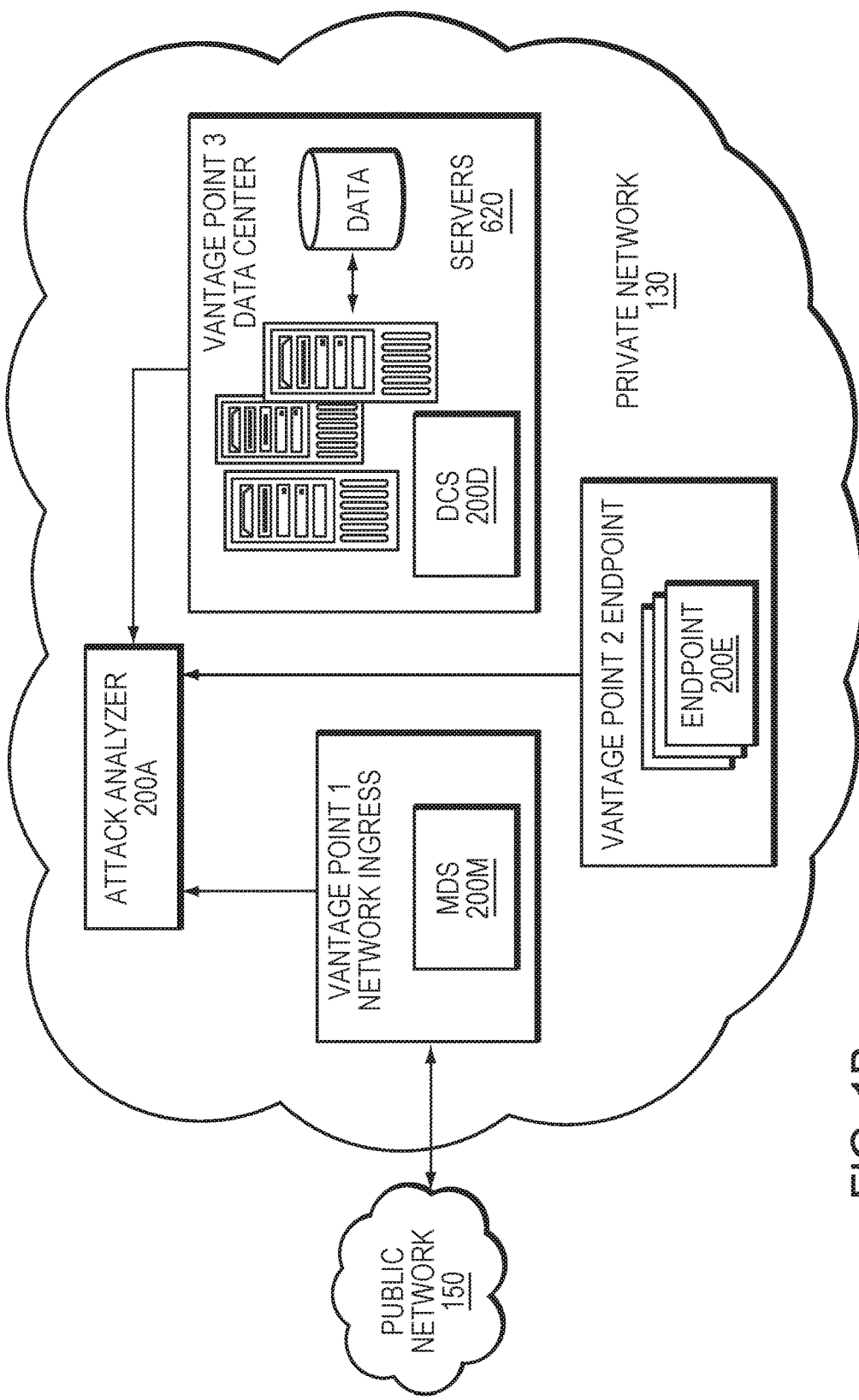
FIG. 1B is a block diagram of a network including an endpoint, a malware detection system (MDS) appliance and a data center security (DCS) appliance interconnected with an attack analyzer that may be advantageously used with one or more embodiments described herein.

FIG. 1B is a block diagram of a network including an endpoint, a MDS appliance and a DCS appliance interconnected with the attack analyzer that may be advantageously used with one or more embodiments described herein. The network, e.g., private network 130, may employ three vantage points to detect indicators of a stealthy (i.e., covert) cyber-attack (SC-attack). As illustrated, the network includes a vantage point 1 located at an ingress point of the private network and implemented as MDS appliance $200_M$; a vantage point 2 located at an endpoint or at each of a plurality of endpoints, each designated $200_E$; and a vantage point 3 located at a data center having one or more servers 620 (and associated storage) and implemented by DCS appliance $200_D$. The MDS appliance $200_M$ is situated and adapted to detect network indicators of an attack, which may be actual behaviors observed as content included in packets received from the public network and processed within the MDS appliance $200_M$. The endpoint 200E is adapted to detect endpoint indicators of an attack, which may be actual behaviors observed during normal operation of the endpoint, such as opening webpages by a web browser running in the endpoint, an email by an email application running in the endpoint or a document by an appropriate document reader (e.g., Microsoft WORD, Adobe Reader) running on the endpoint. The DCS appliance $200_D$ is situated and adapted to detect data center indicators of an attack, which may be actual behaviors observed such as storage accesses by the servers 620. The attack analyzer $200_A$ is centrally located in the network and adapted to interact with the appliances and endpoint(s) to collect and analyze the various indicators from the multiple vantage points to identify and monitor the SC-attack. The endpoint $200_E$, MDS appliance $200_M$ or DCS appliance $200_D$ may also be configured to communicate with one another over any of a variety of different communication channels (e.g., dedicated links or communication network), depending on the embodiment.

Figure 2:
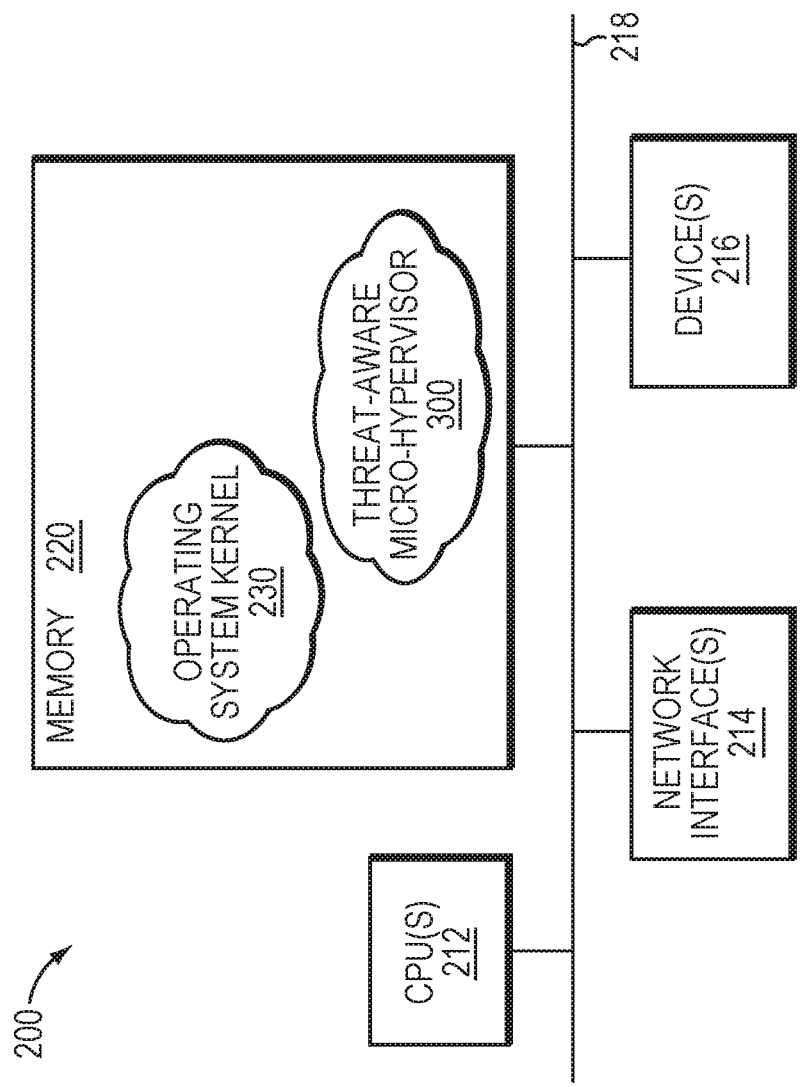
FIG. 2 is a block diagram of a node that may be advantageously used with one or more embodiments described herein.

FIG. 2 is a block diagram of a node 200, e.g., endpoint $200_E$, MDS appliance $200_M$, DCS appliance $200_D$, or attack analyzer $200_A$, that may be advantageously used with one or more embodiments described herein. The node 200 illustratively includes one or more central processing unit (CPUs) 212, a memory 220, one or more network interfaces 214 and one or more devices 216 connected by a system interconnect 218, such as a bus. The devices 216 may include various input/output (I/O) or peripheral devices, such as storage devices, e.g., disks. The disks may be solid state drives (SSDs) embodied as flash storage devices or other non-volatile, solid-state electronic devices (e.g., drives based on storage class memory components), although, in an embodiment, the disks may also be hard disk drives (HDDs). Each network interface 214 may include one or more network ports containing the mechanical, electrical and/or signaling circuitry needed to connect the node to the network 130 to thereby facilitate communication over the network. To that end, the network interface 214 may be configured to transmit and/or receive messages using a variety of communication protocols including, inter alia, TCP/IP and HTTPS.

In one or more embodiments where the MDS appliance $200_M$ is communicatively coupled with the network 130, the network interface 214 may operate as a data capturing device (sometimes referred to as a "tap" or "network tap") that is configured to receive incoming network (data) traffic propagating from public network 120 and into private network 130, and provide at least some of this data traffic or a duplicated copy of the traffic for malware detection. In one embodiment, the MDS appliance may be positioned (deployed) behind the firewall at an ingress point within the private network 130, and at least partially in-line with network devices (e.g., endpoints) so as to capture and analyze the incoming traffic (e.g., through static analysis) and potentially block that traffic which is classified as malware from reaching an internal destination (e.g., the endpoints). In another embodiment, the static analysis may be at least partially performed by the firewall or other intermediate device, or performed by the network interface 214 (e.g., by CPU 212 and/or a digital signal processor on a network interface card).

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code such as, e.g., threat-aware micro-hypervisor 300 as well as modules of endpoint and appliance architectures described herein, and manipulate the data structures. Exemplary CPUs may include families of instruction set architectures based on the x86 CPU from Intel Corporation of Santa Clara, Calif. and the x64 CPU from Advanced Micro Devices of Sunnyvale, Calif.

An operating system kernel 230, portions of which are typically resident in memory 220 and executed by the CPU, functionally organizes the node by, inter alia, invoking operations in support of the software program code and application programs executing on the node. A suitable operating system kernel 230 may include the Windows® series of operating systems from Microsoft Corp of Redmond, Wash., the MAC OS® and IOS® series of operating systems from Apple Inc. of Cupertino, Calif., the Linux operating system and versions of the Android™ operating system from Google, Inc. of Mountain View, Calif., among others. Suitable application programs may include Adobe Reader® from Adobe Systems Inc. of San Jose, Calif. and Microsoft Word from Microsoft Corp of Redmond, Wash. Illustratively, the software program code may be implemented as operating system processes of the kernel 230. As used herein, a process (e.g., a user mode process) is an instance of software program code (e.g., an application program) executing in the operating system that may be separated (decomposed) into one or more threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code, processes, and computer, e.g., application, programs stored in memory, alternative embodiments also include the code, processes and programs being embodied as engines, logic, and/or modules consisting of hardware, software, firmware, or combinations thereof.

Micro-Hypervisor

Figure 3:
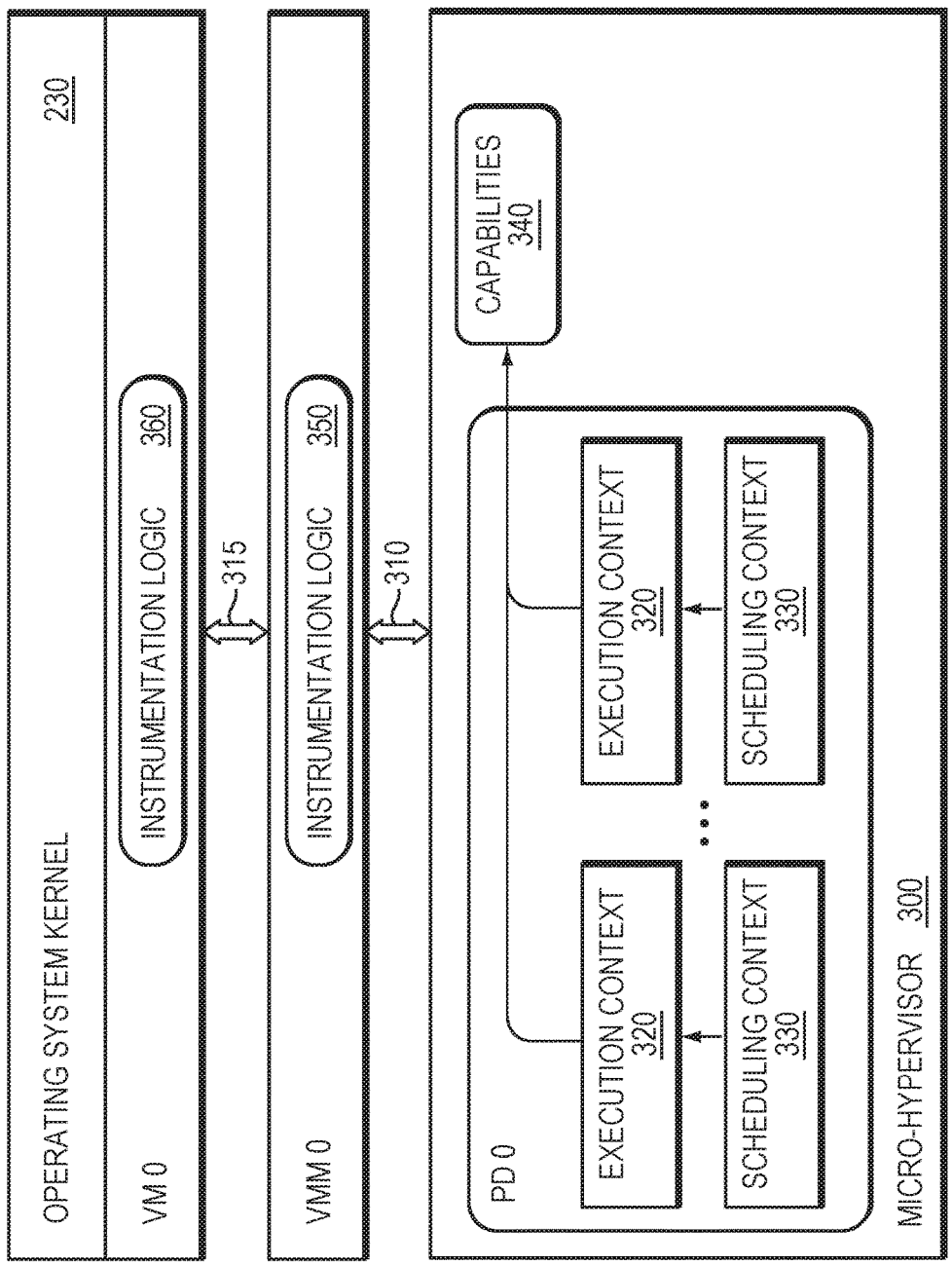
FIG. 3 is a block diagram of a micro-hypervisor that may be advantageously used with one or more embodiments described herein.

FIG. 3 is a block diagram of the threat-aware micro-hypervisor 300 that may be advantageously used with one or more embodiments described herein. The threat-aware micro-hypervisor (herein "micro-hypervisor") may be configured to facilitate run-time security analysis, including attack detection, of operating system processes executing on the node 200. To that end, the micro-hypervisor may be embodied as a light-weight module disposed or layered beneath (underlying, i.e., directly on native hardware) the operating system kernel 230 of the node to thereby virtualize the hardware and control privileges (i.e., access control permissions) to kernel (e.g., hardware) resources of the node 200 that are typically controlled by the operating system kernel. Illustratively, the kernel resources may include (physical) CPU(s) 212, memory 220, network interface(s) 214, and devices 216. The micro-hypervisor 300 may be configured to control access to one or more of the resources in response to a request by an operating system process to access the resource.

As a light-weight module, the micro-hypervisor 300 may provide a virtualization layer having less functionality than a typical hypervisor. Therefore, as used herein, the micro-hypervisor 300 is a module (component) that underlies the operating system kernel 230 and includes the functionality of a micro-kernel (e.g., protection domains, execution contexts, capabilities and scheduling), as well as a subset of the functionality of a hypervisor (e.g., hyper-calls to implement a virtual machine monitor). Accordingly, the micro-hypervisor may cooperate with a unique virtual machine monitor (VMM), i.e., a type 0 VMM, to provide additional virtualization functionality in an operationally and resource efficient manner. Unlike a type 1 or type 2 VMM (hypervisor), the type 0 VMM (VMM 0) does not fully virtualize the kernel (hardware) resources of the node and supports execution of only one entire operating system/instance inside one virtual machine, i.e., VM 0. VMM 0 may thus instantiate VM 0 as a container for the operating system kernel 230 and its kernel resources. In an embodiment, VMM 0 may instantiate VM 0 as a module having instrumentation logic 360 directed to determination of an exploit or malware in any suspicious operating system process (kernel or user mode). Illustratively, VMM 0 is a pass-through module configured to expose the kernel resources of the node (as controlled by micro-hypervisor 300) to the operating system kernel 230. VMM 0 may also expose resources such as virtual CPUs (threads), wherein there is one-to-one mapping between the number of physical CPUs and the number of virtual CPUs that VMM 0 exposes to the operating system kernel 230. To that end, VMM 0 may enable communication between the operating system kernel (i.e., VM 0) and the micro-hypervisor over privileged interfaces 315 and 310.

The VMM 0 may include software program code (e.g., executable machine code) in the form of instrumentation logic 350 (including decision logic) configured to analyze one or more interception points originated by one or more operating system processes to invoke the services, e.g., accesses to the kernel resources, of the operating system kernel 230. As used herein, an interception point is a point in an instruction stream where control passes to (e.g., is intercepted by) either the micro-hypervisor, VMM 0 or another virtual machine. Illustratively, VMM 0 may contain computer executable instructions executed by the CPU 212 to perform operations that initialize and implement the instrumentation logic 350, as well as operations that spawn, configure, and control/implement VM 0 and its instrumentation logic 360.

In an embodiment, the micro-hypervisor 300 may be organized to include a protection domain illustratively bound to VM 0. As used herein, a protection domain is a container for various data structures, such as execution contexts, scheduling contexts, and capabilities associated with the kernel resources accessible by an operating system process. Illustratively, the protection domain may function at a granularity of an operating system process (e.g., a user mode process) and, thus, is a representation of the process.

Accordingly, the micro-hypervisor may provide a protection domain for the process and its run-time threads executing in the operating system. A main protection domain (PD 0) of the micro-hypervisor controls all of the kernel resources available to the operating system kernel 230 (and, hence, the user mode process) of VM 0 via VMM 0 and, to that end, may be associated with the services provided to the user mode process by the kernel 230.

An execution context 320 is illustratively a representation of a thread (associated with an operating system process) and, to that end, defines a state of the thread for execution on CPU 212. In an embodiment, the execution context may include inter alia (i) contents of CPU registers, (ii) pointers/values on a stack, (iii) a program counter, and/or (iv) allocation of memory via, e.g., memory pages. The execution context 320 is thus a static view of the state of thread and, therefore, its associated process. Accordingly, the thread executes within the protection domain associated with the operating system process of which the thread is a part. For the thread to execute on a CPU 212 (e.g., as a virtual CPU), its execution context 320 is tightly linked to a scheduling context 330, which may be configured to provide information for scheduling the execution context 320 for execution on the CPU 212. Illustratively, the scheduling context information may include a priority and a quantum time for execution of its linked execution context on CPU 212.

In an embodiment, the capabilities 340 may be organized as a set of access control permissions to the kernel resources to which the thread may request access. Each time the execution context 320 of a thread requests access to a kernel resource, the capabilities 340 are examined. There is illustratively one set of capabilities 340 for each protection domain, such that access to kernel resources by each execution context 320 (i.e., each thread of an execution context) of a protection domain may be defined by the set of capabilities 340. For example, physical addresses of pages of memory 220 (resulting from mappings of virtual addresses to physical addresses) may have associated access permissions (e.g., read, write, read-write) within the protection domain. To enable an execution context 320 to access a kernel resource, such as a memory page, the physical address of the page may have a capability 340 that defines how the execution context 320 may reference that page. Illustratively, the capabilities may be examined by hardware (e.g., a hardware page fault upon a memory access violation) or by program code. A violation of a capability in a protection domain may be an interception point, which returns control to the VM (e.g., VM 0) bound to the protection domain.

Endpoint Architecture

Figure 4:
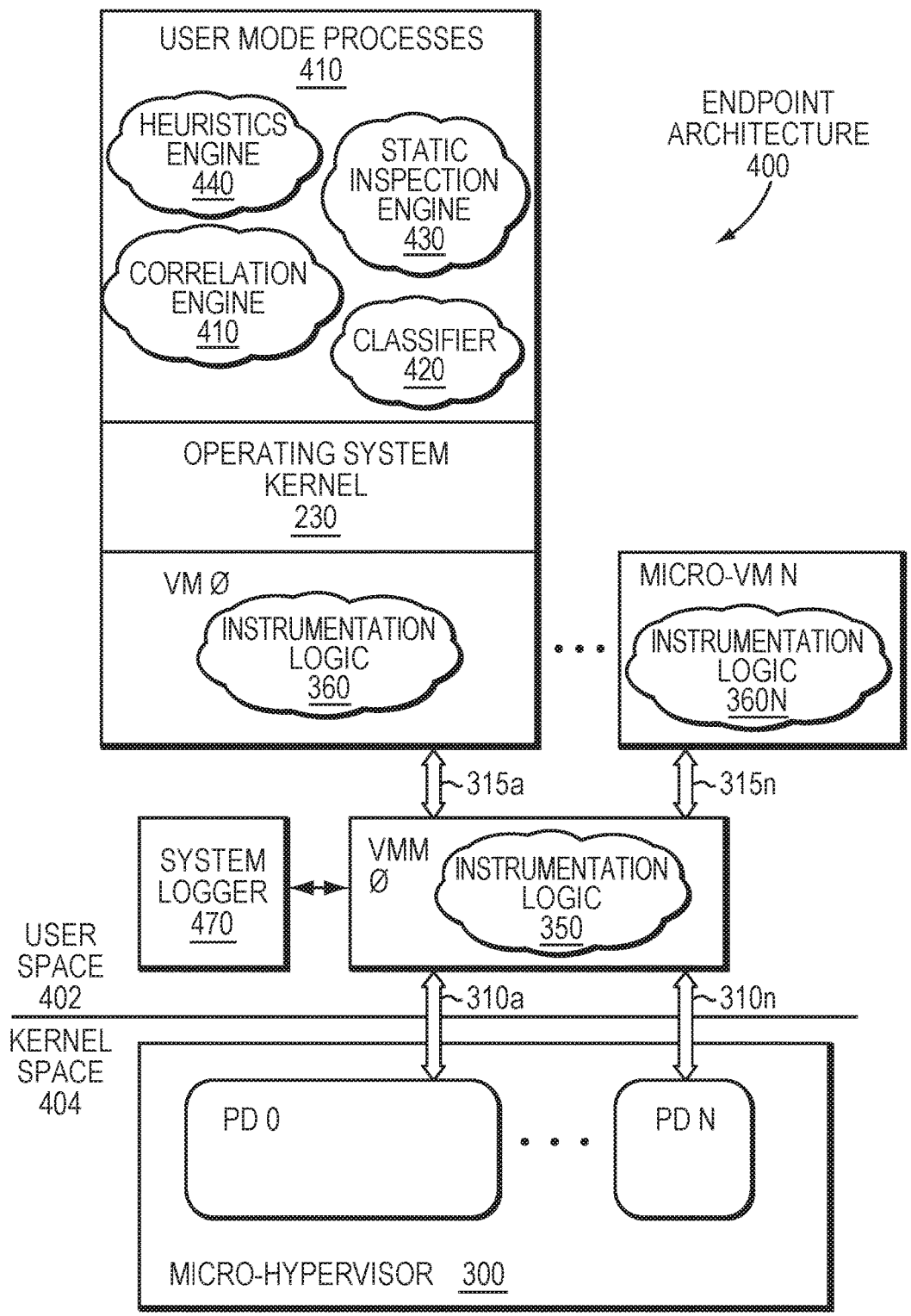
FIG. 4 is a block diagram of an endpoint architecture that may be advantageously used with one or more embodiments described herein.

In an embodiment, the threat-aware micro-hypervisor 300 may be deployed in a micro-virtualization architecture as a module of a virtualization system executing on the endpoint 200$_E$ to provide attack detection within the network environment 100. FIG. 4 is a block diagram of an endpoint architecture 400 that may be advantageously used with one or more embodiments described herein. Illustratively, the architecture 400 may organize the memory 220 of the endpoint 200$_E$ as a user space 402 and a kernel space 404. In an embodiment, the micro-hypervisor may underlie the operating system kernel 230 and execute in the kernel space 404 of the architecture 400 to control access to the kernel resources of the endpoint 200$_E$ for any operating system process (kernel or user mode). Notably, the micro-hypervisor 300 executes at the highest privilege level of the hardware (CPU) to thereby virtualize access to the kernel resources of the endpoint in a light-weight manner that does not share those resources among user mode processes 410 when requesting the services of the operating system kernel 230. That is, there is one-to-one mapping between the resources and the operating system kernel, such that the resources are not shared. A system call illustratively provides an interception point at which a change in privilege levels occurs in the operating system, i.e., from a privilege level of the user mode process to a privilege level of the operating system kernel. VMM 0 may intercept the system call and examine a state of the process issuing (sending) the call. The instrumentation logic 350 of VMM 0 may analyze the system call to determine whether the call is suspicious and, if so, instantiate (spawn) one or more "micro" virtual machines (VMs) equipped with monitoring functions that cooperate with the micro-hypervisor to detect anomalous behavior which may be used in determining an exploit or malware.

In some embodiments, the endpoint 200$_E$ is configured to detect exploits and malicious objects that constitute attacks, as well as behaviors that may appear innocent in and of themselves but, together with other indicators, may signal that an attack has occurred or is occurring. As used herein, an exploit may be construed as information (e.g., executable code, data, one or more commands provided by a user or attacker) that attempts to take advantage of a computer program or system vulnerability, often employing malware. Typically, a vulnerability may be a coding error or artifact of a computer program that allows an attacker to alter legitimate control flow during processing of the computer program by an electronic device (such as a node) and, thus, causes the electronic device to experience undesirable or unexpected behaviors. The undesired or unexpected behaviors may include a communication-based or execution-based anomaly which, for example, could (1) alter the functionality of the electronic device executing application software in a malicious manner; (2) alter the functionality of the electronic device executing the application software without any malicious intent; and/or (3) provide unwanted functionality which may be generally acceptable in another context. To illustrate, a computer program may be considered a state machine where all valid states (and transitions between states) are managed and defined by the program, in which case an exploit may be viewed as seeking to alter one or more of the states (or transitions) from those defined by the program. Malware may be construed as computer code that is executed to harm or co-opt operation of an electronic device or misappropriate, modify or delete data. Conventionally, malware may often be designed with malicious intent, and may be used to facilitate an exploit. For convenience, the term "malware" may be used herein to describe any computer code used in furtherance of a malicious attack, and encompasses both malicious code and exploits detectable in accordance with the disclosure herein, as well as other software that may be used for legitimate purposes in other contexts and whose download and/or use may be detected in accordance with the disclosure herein.

As used herein, the term "micro" VM denotes a virtual machine serving as a container that is restricted to a process (as opposed to VM 0 which is spawned as a container for the entire operating system.) Such spawning of a micro-VM may result in creation of an instance of another module (i.e., micro-VM A0 that is substantially similar to VM 0, but with different (e.g., additional) instrumentation logic 360N illustratively directed to determination of an exploit, malware or an attack in the suspicious process by, e.g., monitoring its behavior. In an embodiment, the spawned micro-VM illustratively encapsulates an operating system process, such as a user mode process 410. In terms of execution, operation of the process is controlled and synchronized by the operating system kernel 230; however, in terms of access to kernel resources, operation of the encapsulated process is controlled by VMM 0. Notably, the resources appear to be isolated within each spawned micro-VM such that each respective encapsulated process appears to have exclusive control of the resources. In other words, access to kernel resources is synchronized among the micro-VMs and VM 0 by VMM 0 rather than virtually shared. Similar to VM 0, each micro-VM may be configured to communicate with the micro-hypervisor (via VMM 0) over privileged interfaces (e.g., 315n and 310n).

In an embodiment, the privileged interfaces 310 and 315 may be embodied as a set of defined hyper-calls, which are illustratively inter process communication (IPC) messages exposed (available) to VMM 0 and VM 0 (including any spawned micro-VMs). The hyper-calls are generally originated by VMM 0 and directed to the micro-hypervisor 300 over privileged interface 310, although VM0 and the micro-VMs may also originate one or more hyper-calls (IPC messages) directed to the micro-hypervisor over privileged interface 315. However, the hyper-calls originated by VM 0 and the micro-VMs may be more restricted than those originated by VMM 0.

In an embodiment, the micro-hypervisor 300 may be organized to include a plurality of protection domains (e.g., PD 0-N) illustratively bound to VM 0 and one or more micro-VMs, respectively. For example, the spawned micro-VM (e.g., micro-VM N) is illustratively associated with (bound to) a copy of PD 0 (e.g., PD N) which, in turn, may be bound to the process, wherein such binding may occur through memory context switching. In response to a decision to spawn the micro-VM N, VMM 0 may issue a hyper-call over interface 310 to the micro-hypervisor requesting creation of the protection domain PD N. Upon receiving the hyper-call, the micro-hypervisor 300 may copy (i.e., "clone") the data structures (e.g., execution contexts, scheduling contexts and capabilities) of PD 0 to create PD N for the micro-VM N, wherein PD N has essentially the same structure as PD 0 except for the capabilities associated with the kernel resources. The capabilities for PD N may limit or restrict access to one or more of the kernel resources as instructed through one or more hyper-calls from, e.g., VMM 0 and/or micro-VM N over interface 310n to the micro-hypervisor. Accordingly, the micro-hypervisor 300 may contain computer executable instructions executed by the CPU 212 to perform operations that initialize, clone and configure the protection domains.

Advantageously, the micro-hypervisor 300 may be organized as separate protection domain containers for the operating system kernel 230 (PD 0) and one or more operating system processes (PD N) to facilitate further monitoring and/or understanding of behaviors of a process and its threads. Such organization of the micro-hypervisor also enforces separation between the protection domains to control the activity of the monitored process. Moreover, the micro-hypervisor 300 may enforce access to the kernel resources through the use of variously configured capabilities of the separate protection domains. Unlike previous virtualization systems, separation of the protection domains to control access to kernel resources at a process granularity enables detection of anomalous behavior of an attack. That is, in addition to enforcing access to kernel resources, the micro-hypervisor enables analysis of the operation of a process within a spawned micro-VM to detect exploits or other malicious code threats that may constitute malware or an attack.

The user mode processes 410 and operating system kernel 230 may execute in the user space 402 of the endpoint architecture 400, although it will be understood to those skilled in the art that the user mode processes may execute in another address space defined by the operating system kernel. Illustratively, the operating system kernel 230 may execute under control of the micro-hypervisor at a privilege level (i.e., a logical privilege level) lower than a highest privilege level of the micro-hypervisor, but at a higher CPU privilege level than that of the user mode processes 410. In addition, VMM 0 and its spawned VMs (e.g., VM 0 and micro-VM N) may execute in user space 402 of the architecture 400. As a type 0 virtual machine monitor, VMM 0 (and its spawned VM 0 and micro-VMs) may execute at the highest (logical) privilege level of the micro-hypervisor. That is, VMM 0 (and its spawned VM 0 and micro-VMs) may operate under control of the micro-hypervisor at the highest micro-hypervisor privilege level, but may not directly operate at the highest CPU (hardware) privilege level.

Illustratively, the instrumentation logic of VMM 0 (and its spawned micro-VMs) may include monitoring logic configured to monitor and collect capability violations (e.g., generated by CPU 212) in response to one or more interception points to thereby infer an attack. Inference of an attack may also be realized through sequences of interception points wherein, for example, a system call followed by another system call having certain parameters may lead to an inference that the process sending the calls is an exploit or malware. The interception point thus provides an opportunity for VMM 0 to perform "light-weight" (i.e., limited so as to maintain user experience at the endpoint with little performance degradation) analysis to evaluate a state of the process in order to detect a possible attack without requiring any policy enforcement. VMM 0 may then decide to spawn a micro-VM and configure the capabilities of its protection domain to enable deeper monitoring and analysis (e.g., through interception points and capability violations) in order to determine whether the process is furthering an attack. Notably, the analysis may also classify the process as a type of exploit (e.g., a stack overflow) or as malware and may even identify the same, or may report the observed behaviors as suspicious and indicative of an attack. As a result, the invocation of instrumentation and monitoring logic of VMM 0 and its spawned VMs in response to interception points originated by operating system processes and capability violations generated by the micro-hypervisor advantageously enhance the virtualization system described herein to provide an attack detection system configured for run-time security analysis of the operating system processes executing on the endpoint.

VMM 0 may also log the state of the monitored process within system logger 470. In an embodiment, the state of the process may be realized through the contents of the execution context 320 (e.g., CPU registers, stack, program counter, and/or allocation of memory) executing at the time of each capability violation. In addition, the state of the process may be realized through correlation of various activities or behavior of the monitored process, wherein the behavior may or may not constitute capability violations. The logged state of the process may thereafter be exported from the system logger 470 to the MDS $200_M$ of the network environment 100 by, e.g., forwarding the state as one or more IPC messages through VMM 0 (VM 0) and onto a network protocol stack (not shown) of the operating system kernel. The network protocol stack may then format the messages as one or more packets according to, e.g., a syslog protocol such as RFC 5434 available from the Internet Engineering Task Force (IETF), for transmission over the network to the attack analyzer $200_A$.

In an alternative embodiment, the endpoint architecture may include an agent (not shown), instead of the micro-hypervisor, VMM 0 and any associated virtual machines, executing as a process within the operating system kernel. To that end, the agent may be embodied as a module of software that is installed on the endpoint (e.g., a target system) to enable a user to monitor and interact with the endpoint, e.g., to gather information about multiple aspects of the endpoint. The agent may also perform analysis of the information or defer the analysis to a controller, which may be a separate component or whose functionality may be integrated into the attack analyzer described herein. The agent and controller may be implemented by the FireEye HX Series endpoint security solution that is commercially available from FireEye, Inc. Exemplary embodiments of the agent and controller are described in U.S. Pat. No. 8,566,476 titled Method and System for Analyzing Data Related to an Event by Shiffer et el., issued on Oct. 22, 2013, which patent is hereby incorporated by reference. Note that this alternative embodiment of the endpoint architecture may be used to detect, correlate, classify, and log suspicious behaviors of operating system processes to enable, inter alia, attack detection on the endpoint as described herein.

Attack Detection on Endpoint

Attack detection on the endpoint may be performed in accordance with one or more processes embodied as software modules or engines containing computer executable instructions executed by the CPU to detect suspicious and/or malicious behaviors of an operating system process (including an application program) when, e.g., executing contents of an object, and to correlate and classify the detected behaviors as indicative of malware (i.e., a matter of probability). Notably, the endpoint may perform (implement) attack detection as background processing (i.e., minor use of endpoint resources) with user-directed data processing being implemented as its primary processing (e.g., majority use of endpoint resources), whereas each appliance implements such attack detection as its primary processing (i.e., majority use of appliance resources). Detection of a suspicious and/or malicious object may be performed at the endpoint by static and dynamic analysis of the object. As used herein, an object may include a logical entity such as, for example, a web page, email, email attachment, file or universal resource locator (URL). Static analysis may perform light-weight (quick) examination of the object to determine whether it is suspicious, while dynamic analysis may instrument the behavior of the object as the operating system process executes (runs) to identify anomalous behavior and capability violations of, e.g., operating system events. A correlation engine 410 and a classifier 420 may thereafter cooperate to perform correlation and classification of the detected behaviors as malicious or not. That is, the correlation engine 410 and classifier 420 may cooperate to analyze and classify observed behaviors of the object (based on the events) as indicative of an attack.

In an embodiment, the static analysis may perform light-weight examination of the object (including a network packet) to determine whether it is suspicious and/or malicious. To that end, the static analysis may include a static inspection engine 430 and a heuristics engine 440 executing as user mode processes of the operating system kernel 230. The static inspection engine 430 and heuristics engine 440 may employ statistical analysis techniques, including the use of heuristics, to perform non-behavioral analysis in order to detect anomalous characteristics (i.e., suspiciousness and/or malware) without execution (i.e., monitoring run-time behavior) of the object. For example, the static inspection engine 430 may employ signatures (referred to as vulnerability or exploit "indicators") to match content (e.g., bit patterns) of the object with patterns of known indicators of known malware in order to gather information that may be indicative of suspiciousness and/or malware. The heuristics engine 440 may apply rules and/or policies to detect anomalous characteristics, such as deviations in communication protocols for packets used to transmit the object and/or deviations in standards for documents (e.g., Portable Document Format) containing the object, in order to identify whether the object is suspect and deserving of further analysis or whether it is non-suspect (i.e., benign) and not in need of further analysis. The statistical analysis techniques may produce static analysis results that include, e.g., identification of communication protocol anomalies and/or suspect source addresses of known malicious servers.

The dynamic analysis may include attack detection performed by, e.g., the micro-hypervisor 300 and micro-VM N to observe behaviors of the object during run-time. In an embodiment, dynamic analysis for attack detection at the endpoint does not generally wait for results from the static analysis. However, in an embodiment, results of the previously performed static analysis may inform (i.e., determine) whether the dynamic analysis is performed. The behaviors of the object may be observed by instrumenting the object or the run-time environment (using, e.g., instrumentation logic 360N) as the operating system process runs at micro-VM N, wherein the observed run-time behaviors may be captured by the micro-hypervisor 300 and VMM 0, and provided to the correlation engine 410 as dynamic analysis results. Illustratively, monitors may be employed during the dynamic analysis to monitor the run-time behaviors of the object and capture any resulting activity. The monitors may be embodied as capability violations configured to trace particular operating system events. During instrumenting of the object at the micro-VM, the system events may trigger capability violations (e.g., exceptions or traps) generated by the micro-hypervisor 300 to enable monitoring of the object's behaviors during run-time. In an embodiment, the monitors may be further configured to detect behaviors that appear benign, but when analyzed collectively with other behaviors, may be indicative of malware.

The static analysis results and dynamic analysis results may be stored in memory 220 (e.g., in system logger 470) and provided to the correlation engine 410, which may provide correlation information to the classifier 420. Alternatively, the results or events may be provided or reported to the MDS appliance $200_M$ for correlation. The correlation engine 410 may be configured to operate on correlation rules that define, among other things, patterns (such as, e.g., sequences) of known malicious behaviors (if-then statements with respect to, e.g., attempts by a process to change memory in a certain way that is known to be malicious) that may collectively correlate to malicious events (activity). In some embodiments, the correlation rules may define patterns of known benign behaviors that may collectively correlate to benign (non-malicious) events. The dynamic analysis may collect the monitored behaviors and cooperate with the correlation engine to examine those behaviors, separately or collectively, as patterns to determine whether they represent malicious or benign events indicative of the presence of malware. For example, a behavior may be detected that appears benign, but when examined with other behaviors, may be indicative of malicious activity.

As noted, a micro-VM may be spawned to instrument a suspect process (object) and cooperate with the micro-hypervisor 300 and VMM 0 to generate capability violations in response to interception points, which capability violations are provided as dynamic analysis result inputs to the correlation engine 410. The rules of the correlation engine 410 may then be correlated against those dynamic analysis results, as well as static analysis results, to generate correlation information pertaining to, e.g., a level of risk or a numerical score used to arrive at a decision of (deduce) maliciousness. The classifier 420 may be embodied as a classification engine executing as a user mode process of the operating system kernel 230 and configured to use the correlation information provided by correlation engine 410 to render a decision as to whether the object is malicious. Illustratively, the classifier 420 may be configured to classify the correlation information, including monitored behaviors (expected and unexpected/anomalous) and capability violations, of the object relative to those of known malware and benign content.

Appliance Architecture

In one or more embodiments, the MDS appliance $200_M$ may be embodied as an intermediate node configured to analyze communication traffic associated with one or more endpoints $200_E$ coupled to a network segment, such as segment 110, of a network, such as private network 130. The MDS appliance $200_M$ may be illustratively positioned (e.g., as an ingress/egress point) within the private network 130 or segment 110 to intercept (i.e., capture) the traffic. In one or more embodiments, the MDS appliance may manage each endpoint by, e.g., requesting replay and instrumentation of the traffic by the endpoint $200_E$. The intercepted traffic may also be replayed and instrumented (i.e., monitored) at the appliance. Thereafter, the instrumented traffic may be correlated at the MDS appliance $200_M$ to communicate the states of instrumentation between the endpoint $200_E$ and appliance. To that end, the MDS appliance may be configured to communicate with and instruct the endpoint to, e.g., perform an action and receive notification of that action. The MDS appliance may be implemented by the FireEye NX Series appliance commercially available from FireEye, Inc.

Illustratively, the MDS appliance $200_M$ may include functionality directed to replaying of communication traffic and correlating instrumentation of that traffic with actions resulting from that traffic at the endpoint. For every network packet received, the appliance may run a heuristic to compute a flow, as appropriate, for the packet, and then create (spawn) a virtual machine (VM) to emulate the endpoint using an image of an operating system (guest operating system and one or more applications) configured to replicate a software processing environment of the endpoint, e.g., based on a payload (object) of the packet to be replayed and instrumented. As noted, an object may include a logical entity such as, for example, a web page, an email or email attachment, an executable (i.e., binary or script), a file (which may contain an executable), or URL. Information as to an appropriate processing environment may be provided by the packet itself, e.g., the packet header may identify the packet type, for example, a document such as a Portable Document Format (PDF) document and, thus, the processing environment may include a document reader, such as a PDF reader from Adobe Systems, Inc. Additionally, or in alternative embodiments, information may also be provided by the endpoint (such as the destination endpoint as specified in the packet) to the MDS appliance indicating a type of application software (process) executing within the operating system on the endpoint. The appliance may then launch a copy of the application along with appropriate instrumentation (i.e., monitor) to process each object. For example, assume the MDS appliance $200_M$ replays HTTPS traffic received at the endpoint which executes, inter alia, an application (i.e., a web browser). The appliance may capture the communication (HTTPS) traffic destined to the endpoint, spawn the VM and launch a copy of the web browser along with instrumentation to monitor the traffic. Thereafter, depending upon the captured traffic, the MDS appliance may issue an administrative alert (e.g., transmit a suitable message over a network) and may instruct the endpoint, e.g., to perform an action, as well as receive notification of that action and, in some embodiments, initiate remediation by instructing the endpoint to invoke protective measures, such as running the objet in a micro-VM or halting execution of the object.

Figure 5:
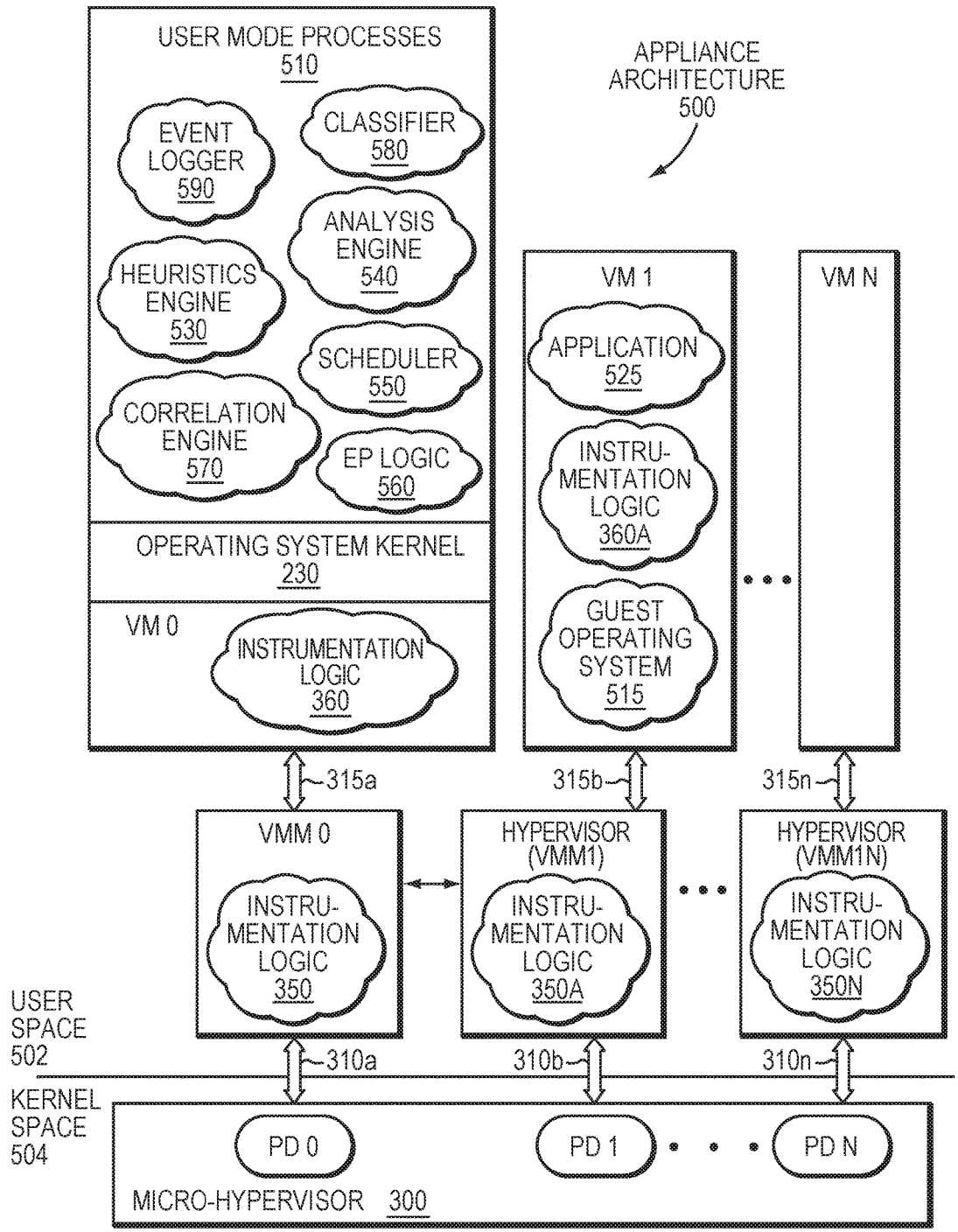
FIG. 5 is a block diagram of an appliance architecture that may be advantageously used with one or more embodiments described herein.

In an embodiment, the threat-aware micro-hypervisor 300 may be deployed in a virtualization architecture as a module of a virtualization system executing on the MDS appliance $200_M$ to provide attack detection within the network environment 100. FIG. 5 is a block diagram of an appliance architecture 500 (e.g., MDS or DCS appliance) that may be advantageously used with one or more embodiments described herein. Illustratively, the architecture 500 may organize the memory 220 of the appliance $200_M$ as a user space 502 and a kernel space 504. The micro-hypervisor may underlie the operating system kernel 230 and execute at the highest privilege level of the CPU within the kernel space 504 of the architecture 500 to control access to the kernel resources of the appliance $200_M$ for any operating system process (kernel or user mode). User mode processes 510 and operating system kernel 230 may execute in the user space 502 of the appliance architecture 500. Illustratively, the operating system kernel 230 may execute under control of the micro-hypervisor at a privilege level (i.e., a logical privilege level) lower than a highest privilege level of the micro-hypervisor, but at a higher CPU privilege level than that of the user mode processes 510. In addition, VMM 0 and VM 0 may execute in user space 502 under control of the micro-hypervisor at the highest micro-hypervisor privilege level, but may not directly operate at the highest CPU (hardware) privilege level.

One or more hypervisors, e.g., type 1 VMM, may be disposed as one or more modules over the micro-hypervisor 300 and operate in user space 502 of the architecture 500 under control of the micro-hypervisor at the highest micro-hypervisor privilege level to provide additional layers of virtualization for the appliance $200_M$. Illustratively, each hypervisor provides full virtualization of kernel (hardware) resources and supports execution of one or more entire operating system instances (i.e., guest operating system) inside one or more full virtual machines. In one or more embodiments, the full virtual machine (VM) may simulate a computer (machine) based on specifications of a hypothetical (abstract) computer or based on an architecture and functions of an actual (real) computer. To that end, a hypervisor (e.g., VMM 1) may instantiate a full VM (e.g., VM 1) as a module provisioned with a software profile that includes a guest operating system (e.g., guest operating system 515) and any associated application programs (e.g., application 525), as well as instrumentation logic (e.g., instrumentation logic 360A) directed to determination of an exploit, malware or any object or application executing on the guest operating system or of suspicious activity indicative of an attack. Illustratively, the hypervisor may instantiate the full VM from a pool of VMs configured to closely simulate various target operating environments (e.g., software profiles) in which the object is to be analyzed. The software profile (e.g., guest operating system and/or application program) provisioned and configured in the VM may be different (e.g., in vendor, type and/or version) from the software profile provisioned and configured in other instantiated VMs (e.g., VM N).

The instantiated VM (e.g., VM 1) is illustratively associated with (bound to) a copy of PD 0 (e.g., PD 1), wherein such binding may occur through memory context switching. In response to a decision to instantiate (spawn) the VM 1, VMM 1 may issue a hyper-call over interface 310b to the micro-hypervisor requesting creation of the protection domain PD 1. Upon receiving the hyper-call, the micro-hypervisor 300 may copy (i.e., "clone") the data structures (e.g., execution contexts, scheduling contexts and capabilities) of PD 0 to create PD 1 for the VM 1, wherein PD 1 has essentially the same structure as PD 0 except for the capabilities associated with the kernel resources. The capabilities for PD 1 may limit or restrict access to one or more of the kernel resources as instructed through one or more hyper-calls from, e.g., VMM 1 and/or VM 1 over interface 310b to the micro-hypervisor.

Illustratively, each hypervisor (e.g., VMM 1-N) may contain computer executable instructions executed by the CPU 212 to perform operations that initialize and configure the instrumentation logic (e.g., instrumentation logic 350A-N), as well as operations that spawn, configure, and control/implement the VM (e.g., VM 1-N) and their instrumentation logic (e.g., 360A). In an embodiment, there is illustratively one hypervisor (e.g., VMM 1-N) for each VM (e.g., VMs 1-N), wherein each VM may be used to simulate (or, in some embodiments, emulate) an endpoint. The MDS appliance $200_M$ may not emulate every endpoint on, e.g., a segment of the network 130, but when a suspicious object (such as, e.g., a file of a network packet) is identified, the VMM 1 of the appliance may create (spawn) a full VM 1 to analyze that object, which may contain software of a typical endpoint required to process the object. The virtualization layers of the MDS appliance $200_M$ may cooperate to implement an abstraction of virtual devices exposed as, e.g., virtual network interfaces to the VMs, as opposed to the real network interfaces exposed to the micro-VMs of the endpoint.

The user mode processes 510 executing on the MDS appliance $200_M$ may include a heuristic engine 530 that, in response to receiving communication traffic, is configured to run one or more heuristics to determine whether the traffic (e.g., an object of a packet) is suspicious. Illustratively, the heuristic engine may use pre-defined anomalous characteristics to identify packets that may be suspicious and thus associated with verified attacks to, e.g., identify communication protocol anomalies and/or suspect source addresses of known malicious servers. For example, the heuristic engine may examine metadata or attributes of the object and/or a code image (e.g., a binary image of an executable) of the object to determine whether a portion of the object matches a predetermined pattern or signature associated with a known type of attack. In addition, the heuristic engine 530 may provide the packet of the suspicious traffic to one or more processes 510 embodied as analysis engine 540.

In an embodiment, the analysis engine 540 may be configured to perform static analysis of the object of the packet to, e.g., identify software profile information associated with an operating system instance for execution in a full VM (virtualizing all kernel resources). The analysis engine 540 may also be configured to analyze other content of the packet (e.g., destination address of a network header) to determine its destination (i.e., the endpoint). To that end, the analysis engine 540 may be configured to cooperate with a module, e.g., endpoint (EP) logic 560, to communicate with the endpoint $200_E$, e.g., to identify and/or acquire information (including the software profile) associated with execution of an object on the endpoint associated with the attack. The analysis engine 540 may then provide the software profile information to another process embodied as scheduler 550, which may coordinate with the hypervisor, e.g., VMM 1, to spawn a VM, e.g., VM 1, to replay the traffic.

When replaying the traffic, the analysis engine 540 may employ the EP logic 560 to invoke appropriate instrumentation logic 360A of VM 1 to enable communication with the endpoint to perform dynamic analysis and/or correlation of the suspicious object. In an embodiment, correlation (as described herein) may be performed by one or more user mode processes embodied as a correlation engine 570. The instrumentation logic 360A may be configured to monitor different types of objects, such as payloads of network (web) and email packets, although alternatively, there could be separate web-based and email-based MDS appliances, each of which may be deployed the same way and configured to perform that same work. The MDS appliance $200_M$ may include a module that communicates with a similar module on the endpoint to perform the requested instrumentation. For example in the case of email objects, the application may be an email reader that analyzes email traffic captured by the appliance (and endpoint).

During instrumentation (monitoring) in VM 1, the object may manifest behaviors that are captured by the micro-hypervisor and VMM 1. That is, the object may execute within the software profile of VM 1 and its monitored operation (behaviors) observed. The micro-hypervisor 300 and VMM 1 may record any resulting activity as, e.g., an event within a database of another user mode process embodied as an event logger 590. In addition, the activity of the object (including the event) may be provided to the correlation engine 570 and to yet another user mode process embodied as a classifier 580 for classification and/or validation of the object as, e.g., an exploit or malware, or reporting the object as associated with an attack. Illustratively, correlation engine 570 may be configured to correlate observed behaviors (e.g., results of dynamic analysis) with known malware and/or benign objects (embodied as defined rules) and generate an output (e.g., a level of risk or a numerical score associated with an object) that is provided to the classifier. The classifier 580 may be configured to classify the observed behaviors (expected and unexpected/anomalous) and capability violations of the object relative to those of known attacks and benign content to render a decision of an attack having occurred, i.e., validate the monitored operation of the object as malicious activity, based on the risk level or score exceeding a probability threshold.

In an alternative embodiment, the appliance architecture may include a single hypervisor and virtual machine monitor with one or more virtual machines, instead of the micro-hypervisor, wherein the hypervisor operates within the kernel space 404 and executes at the highest privilege level of the CPU. Notably, this alternative embodiment of the appliance architecture may also be used to detect, correlate, classify and log suspicious behaviors of operating system processes to enable, inter alia, attack detection as described herein.

In another alternative embodiment, the appliance architecture may include various engines and logic such as, inter alia, a static instrumentation engine and a dynamic run-time test and observation (RTO) engine, organized as a malware content detection (MCD) system. Briefly, static instrumentation engine receives ingress network content and generates a representation of the content that is analyzed with one or more various software analysis techniques (e.g., control information analysis, or data analysis). The content is then provided to RTO engine, which acts as an intelligent testing function to collect information with respect to run-time behaviors (events) during virtual execution of network content. An exemplary embodiment of a MCD system is described in commonly owned U.S. patent application Ser. No. 13/828,785 titled Correlation and Consolidation of Analytic Data for Holistic View of a Malware Attack by Manni et el., filed on Mar. 14, 2013, which application is hereby incorporated by reference.

Operationally, the MDS appliance may intercept (i.e., receive) and store communication traffic flowing over the network that is destined to the endpoints. The appliance may analyze the traffic and communicate with the endpoints over the network using a messaging protocol that encapsulates an object of interest (e.g., a file of a network packet). Illustratively, the MDS appliance may deploy a network protocol stack, e.g., of the operating system kernel 230 configured to employ a protocol to communicate with the endpoints. For example, the appliance may initiate remediation by communicating to (i.e., instructing) the endpoint to invoke protective countermeasures, such as halting execution of the object.

In an embodiment, the MDS appliance $200_M$ may provide the foundation of the attack analyzer $200_A$, which may be centrally located in the network and embodied to execute software program code and application programs configured to interact with (e.g., manage) the appliances and endpoint (s) in the enterprise network. Notably, the software code and/or application programs may be further configured with an aggregated analysis function that collects inputs (e.g., observable behaviors) related to objects or tools processed by various nodes of the network. For example, the attack analyzer may gather and analyze observable behavior of an object or tool processed by the MDS appliance near the perimeter of the network, the DCS appliance near the data center and the endpoint internal to the network to provide an aggregated view of the behavior.

In an embodiment, the MDS appliance $200_M$ may also provide the foundation of the DCS appliance $200_D$ located approximately at a data center (i.e., an emplacement of one or more servers) of the enterprise network 130. Illustratively, the data center may include a plurality of storage systems or servers that are accessible through a core network connecting the endpoint and appliances to the servers. The DCS appliance may reside in front of the servers (or alternatively on a same network segment as the servers) and may be configured with certain functions that transform the appliance into a stealthy (i.e., covert) cyber-attack (SC-attack) protection system. In some embodiments, the architecture and operation of the DCS appliance $200_D$ may be as described above with respect to the MDS appliance $200_M$; however, certain functions not described above may be provided as described herein.

As used herein, a SC-attack is one or more covert (i.e., intentionally avoiding detection) and persisting (i.e., continuous or repeated) cyber-attacks (e.g., a computer hack) targeting a specific entity (target). The SC-attack may employ sophisticated and covert (i.e., difficult to detect) tools and procedures using malware, often to exploit vulnerabilities in the target. The SC-attack may target organizations and/or nations for business and/or political motives. That is, the SC-attack is a cyber-threat involving persistently (i.e., repeatedly) waged cyber-attacks against a predetermined target (a state or private organization) by a threat actor, who is often state-sponsored, but may also be affiliated with a stateless national group, a terrorist group, and/or a cybercriminal organization.

Employing any of the various tools and procedures, each SC-attack may be carried out in multiple phases, and with multiple different attack scenarios, to break into and systematically compromise a network or other cyber-resource while avoiding detection in order to harvest sensitive information (e.g., state or military secrets). Illustratively, the phases of an SC-attack may include, inter alia, (1) a credential gathering phase using a downloaded credential cracking tool (i.e., initial movement into the network) and (2) a data gathering phase accessing sensitive information in the network (i.e., lateral movement within the network). In addition, an SC-attack may also include (3) an exfiltration phase in which the gathered data is exported from the private network to an external system in the public network. As such, the SC-attack may involve an external command and control system to continuously monitor and extract sensitive information from the target. It should be noted that the phases of the SC-attack are provided for illustrative purposes and real world attacks may include the same or a different number or sequence of phases for carrying out the purposes of the attack or camouflage the attack from detection.

For example, a particular class of SC-attack, known as an advanced persistent threat (APT), illustratively includes: (1) a first phase, wherein an initial code package ("kit") is installed in the target's network; (2) a second phase, wherein the kit communicates with (i.e., "calls back") an external command and control system (via the public network) to obtain instructions or a further (malicious) download having, e.g., a cracking tool, reconnaissance tool and/or phishing tool; (3) a third phase, wherein legitimate credentials of the target are obtained using the kit and/or the downloaded tools; and (4) a fourth phase, wherein the kit or the downloaded tools (or both) extract sensitive information from the target (data exfiltration) which is sent to the external command and control system. Note that any SC-attack is strategically designed for a high degree of covertness (i.e., stealth) over a period of time by avoiding use of recognizable malware and associated behaviors that are detectable using traditional malware-based security architectures. Nevertheless, an SC-attack may still use malware, even if covertly. Illustratively, the callback communication (i.e., second APT phase) from the kit to the external command and control system may be detected and the kit classified as malware when the command and control system is known to disseminate malware, e.g., an internet address of the command and control system appears on a malware blacklist.

Another class of SC-attack, illustratively known as a reconnaissance attack (RC-attack), illustratively includes: (1) a first phase, wherein a reconnaissance tool is installed in the target's network (i.e., private network); (2) a second phase, wherein the reconnaissance tool monitors network activity so as to map the private network by, e.g., snooping access requests to data center servers (and/or generating network packets to probe the private network including the data center servers) in order to obtain network addresses and types of data stored at the data center servers; and (3) a third phase, wherein a map of the private network (data exfiltration) is sent to the external command and control system. Note that a series of progressive SC-attacks may constitute a cyber-campaign against a target, e.g., an RC-attack followed by an APT attack.

As noted, the DCS appliance may be configured with certain functions that transform the appliance into the stealthy SC-attack protection system for use in association with a data center. One such function of the appliance involves a standard Intrusion Prevention System (IPS) function using vulnerability signatures for qualified and updated server type vulnerabilities. A second function of the appliance is the ability to analyze file system protocols, such as Server Message Block (SMB), Common Internet File System (CIFS) and Network File System (NFS), that operate over local area networks (LAN), e.g., private network 130. As described herein, the DCS appliance may parse (i.e., decode) messages or packets embodying the file system protocols in order to identify the endpoint attempting to access the sensitive information stored on the data center servers. In addition, the DCS appliance may extract files, such as executables (e.g., binaries and scripts) and documents (e.g., PDFs), from the packets and run those files on virtual machines of the appliance to determine whether they may be part of an attack. A third function of the DCS appliance involves its participation in the aggregation technique described herein where, for example, the presence (and occurrence) of excessive remote mounts (i.e., access to the sensitive data) by the endpoint may be visible to the DCS appliance, e.g., as result of decoding of the file system protocols.

Although it may be configured to detect an initial infiltration of the SC-attack into the enterprise network, the MDS appliance is generally not situated (i.e., lacks sufficient vantage point) nor configured (i.e., lacks adequate technology) to detect an arbitrary lateral movement of the SC-attack (i.e., attempt to obtain information from or move to another node) towards the data center, which is typically protected by traditional IPS technology. Illustratively, the MDS appliance may implement IPS technology to search for signature-based exploits and malware to successfully detect the initial infiltration portion (e.g., download of the cracking tool) of a life-cycle of an SC-attack. However, the traditional IPS technology may fail to detect the lateral movement of an SC-attack inside the enterprise network, because later stages of the SC-attack life-cycle do not typically make use of observable (e.g., detectable via IPS technology) exploits or malware to gain access to servers of the data center. Instead, the later stages of the SC-attack may perform credential cracking using, e.g., one or more cracking tools to obtain credentials that enable legitimate login to the data center servers. That is, the later stages of the SC-attack generally do not employ malware, but rather employ an object containing the cracking tool that is downloaded (passed) to the desktop. The cracking tool then runs a cracking program to recover a legitimate credential (e.g., a password) by, e.g., downloading one or more password files from a server of the network. The cracking program may then employ the legitimate password to access the data center servers, without the use of malware or exploits. As result, later stages of the SC-attack may be undetectable using traditional signature-based malware detection technology because the access to the servers by the later-stage SC-attack uses legitimate credentials.

Centralized Aggregation Technique

Embodiments described herein provide a centralized aggregation technique for detecting lateral movement of a stealthy (i.e., covert) cyber-attack (SC-attack) to access sensitive information stored on one or more servers of a data center in an enterprise network (i.e., private network 130). In an embodiment, the attack analyzer may collect, analyze and combine the end node-based and network-based indicators (as well as observed behaviors) from multiple vantage points in the network to identify and monitor (track) the SC-attack. The SC-attack may occur in multiple phases, e.g., a credential gathering phase using a downloaded credential cracking tool (i.e., initial movement into the network) and a data gathering phase accessing sensitive information in the network (i.e., lateral movement within the network). As used herein, a lateral movement indicates an attempt, other than the initial infiltration, to access the network or resources on the network (e.g., access the sensitive information on the data center servers). Note that the lateral movement may include movement to another node (e.g., endpoint) in accordance with multiple phases to further carry-out the SC-attack.

Figure 6:
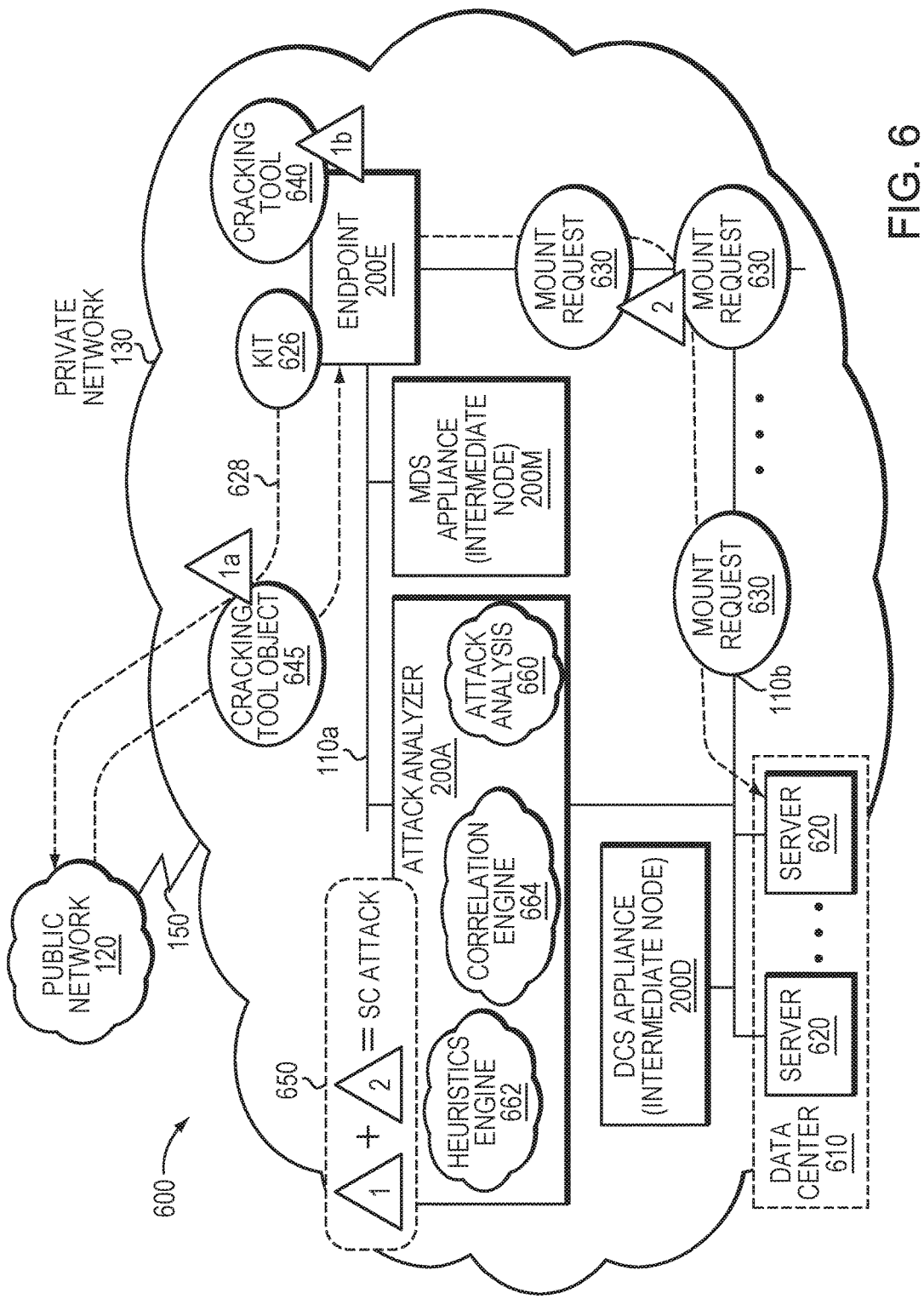
FIG. 6 is a block diagram of a centralized aggregation technique for detecting lateral movement of a stealthy attack in an enterprise network.

FIG. 6 is a block diagram of the centralized aggregation technique 600 for detecting lateral movement of the SC-attack in the enterprise network. As noted, the DCS appliance $200_D$ may be located, e.g., approximately at (i.e., near) a data center 610 of the enterprise network 130, wherein the data center may include a plurality of storage systems or servers 620 that are accessible through an internal network (i.e., the enterprise network 130) having a plurality of segments 110a,b connecting the endpoint $200_E$ as well as the MCS and DCS appliances to the servers. The DCS appliance $200_D$ may reside in front of the servers (or alternatively on a same network segment 110b as the servers 620), while the MDS appliance $200_M$ may be located, e.g., approximately at (i.e., near) a periphery of the network (e.g., at an ingress segment 110a of the enterprise network) and the endpoint $200_E$ may be internally located within the enterprise network. Further the attack analyzer $200_A$ may be located (e.g., on network segment 110a and 110b) to receive information from any vantage point (e.g., endpoint or appliance). As described herein, the endpoint may be security compromised resulting in the downloading and executing of a tool (e.g., a cracking tool 640) used to carry out the SC-attack through the use of, e.g., credential cracking. Note that the tool may have a legitimate purpose and, thus is not conclusive of an attack.

Illustratively, the attack analyzer $200_A$ may include an aggregated analysis function or engine 660 that determines the SC-attack using a heuristics engine 662 and a correlation engine 664 which aggregate and correlate information related to the indicators 1b and 2 provided from the vantage points of, e.g., the network periphery via the MDS appliance, the internal network via the endpoint, and the data center via the DCS appliance, to create an aggregated view of the lateral movement of the SC-attack. That is, the attack analyzer may be used to acquire network-wide (i.e., from the one or more endpoints, as well as the MDS and DCS appliances) information so as to determine the attack. As such, the attack analyzer receives various types of information, including, but not limited to, the network-wide indicators and observations (e.g., observed behaviors). In addition, the attack analyzer may declare the attack by, e.g., issuing an alert or report to a separate management console or similar network-based device. As such, exfiltration of the sensitive information via the public network may also be blocked by one or more of the nodes (e.g., MDS appliance) in the private network. Moreover, an attack signature (e.g., used to determine whether to declare an attack) may be constructed based on the indicators with scores sufficient to give rise to declaration of the attack.

In an alternative embodiment, the attack analyzer may include various logic such as, inter alia, configuration logic, distribution logic, aggregation logic, correlation logic and/or consolidation logic, organized as a management system. Briefly, the configuration logic provides centralized control of the functionality of the appliances (e.g., embodied as MCD systems). The distribution logic allows the management system to influence analysis priorities at one MCD system based on suspicious network content detected at another MCD system. The aggregation logic is configured to request (e.g., push or pull) analytic data from each of MCD system, where at least a portion of the analytic data is used by the correlation logic. The correlation logic compares analysis attributes supplied by one or more MCD systems to determine related network content, and the consolidation logic consolidates input attributes associated with the compared (and matched) analysis attributes. An exemplary embodiment of a management system is described in commonly owned U.S. patent application Ser. No. 13/828,785 titled Correlation and Consolidation of Analytic Data for Holistic View of a Malware Attack by Manni et el., filed on Mar. 14, 2013, which application is hereby incorporated by reference.

In an embodiment, the appliances (MDS and DCS) and endpoint may provide (i.e., report) results from applying heuristics to the attack analyzer, wherein the heuristics may be applied to one or more tools downloaded to the endpoint, as well as actions (i.e., observable behaviors) resulting from operation of the tools at the endpoint. Note that the heuristics may include static as well as behavioral analysis of the tools and their use. The heuristic results may then be used to determine whether the tools and actions manifest observable behaviors of the lateral movement of the SC-attack. That is, the combination of (i) detecting download of a tool used to perform credential stealing at an endpoint (an end node-based indicator 1a,b) and (ii) detecting unusual patterns of credential use on the network (a network-based indicator 2) indicates a likelihood of unauthorized use of legitimate credentials that denotes an SC-attack. Illustratively, the observable behaviors may include (i) unauthorized use of legitimate credentials obtained at the endpoint, as well as (ii) unusual access patterns via actions originated at the endpoint to acquire sensitive information stored on one or more servers on the network (e.g., at the data center). Notably, the end node-based indicator 1 may include detecting object 645 during download (indicator 1a) as well as presence of the tool 640 at the endpoint (indicator 1b). In other embodiments, the end node-based indicator may include detecting a callback 628 from a kit 626 that downloads the object 645. The attack analyzer may then collect and analyze information related to the observable behaviors provided by the appliances and endpoint (i.e., node-based and network-based indicators) to create a holistic (i.e., aggregated) view of the lateral movement of the SC-attack 650 and to declare (e.g., issue an alert) that an attack is in progress on the network.

In an embodiment, the tool downloaded to the endpoint may be a credential cracking tool although other tools, such as reconnaissance, surveillance and phishing tools, may be similarly downloaded to obtain legitimate (i.e., authentic) credentials used carry out the SC-attack. Illustratively, the small malicious package (kit 626) may be downloaded to the endpoint to initiate security compromise of (i.e., gain an initial foothold in) the enterprise network. Rather than a small malicious package, the kit 626 may be alternatively a human actor initiating the download and use of the tool. Thereafter, the kit 626 may obtain instructions and possibly a larger malware package (e.g., object 645) having the tool. Notably, the malware kit 626 need not be detected by the MDS appliance or the endpoint. The presence of the tool may be detected from the vantage point of the MDS appliance and/or the endpoint as a (outbound) request 628 (i.e., callback) to obtain the (inbound) object 645 containing the tool being downloaded. As used herein, a vantage point denotes a logical position (e.g., network segment 110a,b or endpoint 200) within the enterprise network from which network activity or behaviors may be observed as well as node-based activity (e.g., execution of the tool). As previously noted, the MDS appliance may be situated (deployed) near the periphery of the enterprise network (i.e., network segment 110a) to monitor the outbound request and detect the subsequent inbound and, in some embodiments, outbound traffic to/from the network and thus detect an inbound presence of the tool. Although it may provide the tool to the endpoint, the MDS appliance may block any actual exfiltration (i.e., export to the attack command and control system) of data (e.g., credentials or other sensitive data) obtained from use of that tool. In addition, the DCS may also block exfiltration of information from the data center. It should be noted that the kit may be classified (i.e., deemed) as malware (by the classifier 420, 580) when an Internet address of the outbound request appears on a malware blacklist. Similarly, the kit 626 or object 645 may be classified as malware when monitored (instrumented) operation of the kit or object exceeds a risk level or probability threshold of maliciousness. Nevertheless, mere classification of the object as malware (i.e., an end node-based indicator alone) is insufficient to declare an SC-attack.

Illustratively, the end node-based indicator (a first indicator 1a,b) of an SC-attack 650 is determined by the MDS appliance and/or endpoint that detects the presence of the tool (i) statically by using signatures (e.g., via IPS technology) of well-known credential cracking tools and/or (ii) dynamically by instrumenting executables (e.g., binaries or scripts) of a file and/or object containing the cracking tool within (micro) virtual machines of the MDS appliance and/or endpoint (i.e., VM N of the MDS or micro-VM N of the endpoint). Heuristics may then be applied to the signatures and/or instrumented executables to determine whether they manifest behaviors consistent with suspicious use of a cracking tool. Further, to differentiate an arbitrary executable from one that is a credential cracking tool, the heuristics may apply a behavioral pattern, either statically or dynamically, to discover behaviors (actions) of the cracking tool, such as iteratively attempting to match against encrypted passwords (e.g., brute-force password cracking). If so, such behaviors may provide the first indicator 1a,b (i.e., the node-based indicator) of the SC-attack. As noted, in other embodiments, the end node-based indicator may also include detecting a callback to a known malicious Internet address and classifying monitored behavior(s) of the object as malicious.

In addition, a second indicator 2 (e.g., the network-based indicator) may be determined from actions originated at the endpoint, which may include an unusual pattern (e.g., excessive number) of authentication requests (e.g., remote mount requests 630) to the data center servers, although the actions may further include other unusual access patterns such as, e.g., queries and data access requests, to the data center. In an embodiment, a type of network-based indicator may include a data center-based indicator (i.e., near the data center), which may be determined from the unusual pattern of authentication requests in lieu of or in addition to the network-based indicator determined near the endpoint. As such, the second indicator may be a network-based indicator near the endpoint or a data center-based indicator near the data center, each of which may be understood as a type of network-based indicator. Illustratively, the second indicator, as embodied within the heuristics executed at the DCS appliance, may involve the notion of an SC-attacker using a file system protocol (e.g., NFS and CIFS) over the enterprise network to attempt an unusually excessive number of remote mounts in order to connect to, e.g. one or more directories of files relating to the sensitive information. That is, the second indicator may be determined when a number of access requests (e.g., remote mounts) originating from a network segment exceeds a threshold of an expected number of authorized accesses during a time window (e.g., 200 mount requests from a single endpoint in 2 minutes). Illustratively, the DCS appliance may examine the access requests by parsing (e.g., decoding) messages embodying the file system protocol, e.g., to identify the endpoint attempting to access the sensitive information as well as the server and, further, as a protection measure to remove any executables and/or files encapsulated within the messages of the protocol. Moreover, use of the tool may then be monitored to track lateral movement of the attack at the endpoint and from other endpoints within an organization (e.g., a CFO's notebook computer or a Commanding General's notebook computer). Notably, the lateral movement behavior of the SC-attack in the form of excessive remote mounts on the network (i.e., the network-based indicator) by the endpoint(s) may be detected from the vantage point of the DCS appliance (i.e., the data center-based indicator). Accordingly, network-based indicators may be referred to alternatively as data center-based indicators for some embodiments.

Illustratively, the network-wide indicators and observed behaviors of the attack may be aggregated (i.e., collected at a central point such as at the attack analyzer $200_A$) from the different vantage points, e.g., the network periphery segment 110a via the MDS appliance (indicator 1a); and/or internally within the network via the endpoint (i.e., determining the node-based indicator); and the data center via the DCS appliance (i.e., determining the network-based indicator) to further determine the possibility of anomalous activity in the network. For example, the DCS appliance may detect (i.e., "find" by monitoring) activity in the network emanating from use of the tool and, in response, may determine whether the detected activity is anomalous. To that end, a correlation engine (e.g., correlation engine 570) of the appliance (MDS or DCS) may cooperate with a classifier (e.g., classifier 580) to employ a scoring or weighting process (e.g., based on experiential knowledge) to detect an attack based on the activity or pattern of activity. Similarly, the attack analyzer may correlate the network-wide indicators and observed behaviors using a correlation data set larger than that of the MDS or DCS, so as to make a more accurate determination of an attack, e.g., a higher score from the attack analyzer correlation indicating greater probability of an attack. As noted, the end node-based indicator includes, e.g., detecting and identifying a cracking tool operating on the endpoint, while the network-based indicator includes, e.g., detecting a large number of authentication requests, such as remote mounts, from the endpoint to the data center. The node-based and network-based indicators may be determined on different nodes in the network, each having a vantage point suitable to determine the respective indicator.

Figure 7:
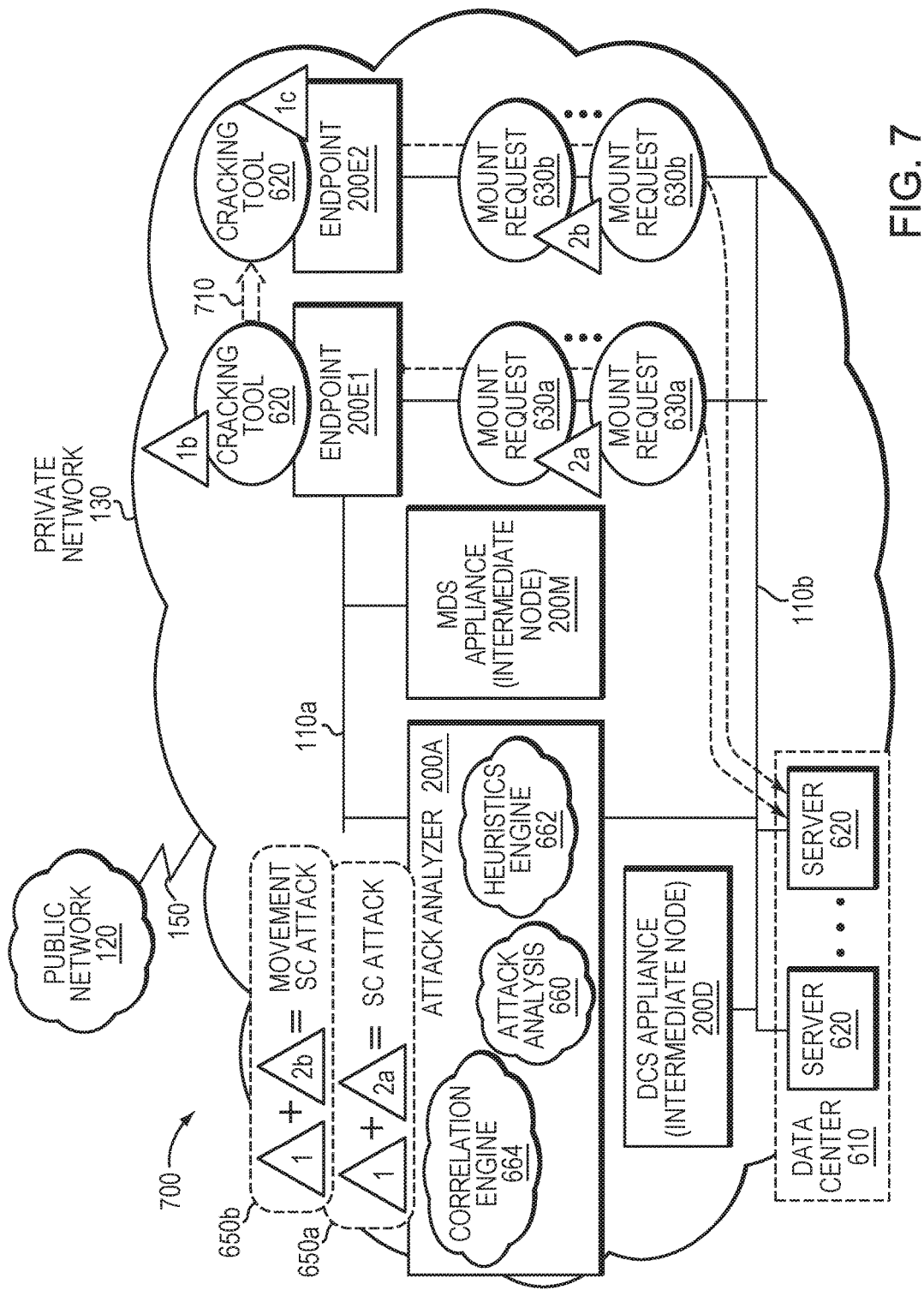
FIG. 7 is a block diagram of the centralized aggregation technique for detecting multiple lateral movements of the stealthy attack in the enterprise network.

In an embodiment, the attack analyzer may collect, analyze and combine the node-based and network-based indicators from multiple vantage points in the network to identify and monitor (track) the SC-attack. FIG. 7 is a block diagram of the centralized aggregation technique 700 for detecting multiple lateral movements of the SC-attack in the enterprise network 130. Illustratively, the attack analyzer $200_A$ may be configured to observe and gather additional indicators 1c, 2b (e.g., a second set of mount requests 630b) as opposed to initial indicators 1b, 2a (e.g., a first set of mount requests 630a) of the attack from other nodes (e.g., endpoint $200_{E2}$ in addition to an initial lateral movement from endpoint $200_{E1}$) in the network to provide the holistic view of the attack lifecycle 650a,b, i.e., monitor progress (further lateral movements) of the attack. For example, the attack analyzer may scan the network to determine whether the object containing the cracking tool has propagated nefarious operations to other endpoints (e.g., $200_{E2}$), where the operations may be traced to operation of the tools performing, e.g., credential cracking, reconnaissance, and/or phishing, used to initiate unusual access patterns such as, e.g., remote mounts, probes of the network, and/or data access requests, to the data center.

The attack analysis engine 660 may then (1) develop a signature, preferably denoted as an attack indicator (or multiple signatures, specific to the type of device and activity it may see), based on the full information and share the appropriate signature with the other devices within (customer) enterprise network to enable them to detect other attacks (or pieces of attacks); (2) report the likelihood of an attack citing specific information (e.g., links of the indicators and observed behaviors to the attack) to the customer, which report may include additional information than the original "detecting" product may report; and (3) upload the full information to a central cloud-based facility, which may perform further analysis (including cross-customer or cross-industry analysis) to better understand the nature of the threat, and potentially expand the threat intelligence and issue signatures as well as possibly corrective actions, such as remediation (e.g., to close vulnerabilities).

In its broader aspects, the technique may be practiced to detect a variety of types of sophisticated attacks, i.e., waged covertly and in multiple phases (e.g., analogous to those described above). For example, the technique may be embodied as a method, system or computer program product adapted to (i) detect receipt of a download (transmission) of an object from a public network to an endpoint located on a private network, the object containing executable software (e.g., script or computer code); (ii) determine a first indicator of an attack by detecting the executable software at a first network vantage point, e.g., at the endpoint of the network (an end node-based indicator) or at an appliance at a first segment approximately at the periphery of the private network or a subnetwork thereof (a network-based indicator); (iii) determine a second indicator of the attack (a data center-based indicator) by detecting (e.g., at a second segment of the private network different from the first segment and approximately at a data center that includes one or more servers) a suspicious pattern of accesses to the one or more servers at a second network vantage point, the second network vantage point differing from the first network vantage point; (iv) aggregate the first and second indicators to declare the attack in progress on the private network; and (v) aggregate additional first and second indicators from additional (e.g., third) vantage points to track (i.e., follow) the attack lifecycle.

Advantageously, the technique leverages the locations and functions of the MDS appliance, the endpoint, and the DCS appliance to triangulate (i.e., process information from three or more vantage points) the observables (e.g., node-based and network-based indicators) from the different vantage points to detect lateral movement in the network of the SC-attacker. For example, although the presence of the cracking tool (as well as the cracking of credentials) may not be visible to the DCS appliance, the tool may be visible to either (or both) of the MDS appliance and endpoint. The combination of the observable indicators, e.g., detection of a cracking tool downloaded to the endpoint (node-based indicator) and a large number of remote mounts to a data center server from that endpoint (network-based indicator), provides visibility into the SC-attack that infiltrates the enterprise network. In essence, the technique considers the sum total of the behaviors of cracking tool as well as the subsequent accesses to the internal servers to deduce that the endpoint is not exhibiting legitimate behavior, but rather exhibiting the behavior of an attacker/intruder operating within the enterprise network. The views from multiple vantage points may thus be combined to detect (i) an SC-attack 650a that is currently underway in the enterprise network and (ii) the lateral movement of the attack 650b through the network as a result of unauthorized use of legitimate credentials to gain access to the sensitive information through a series of unusual access patterns to the data center servers.

In an embodiment, the executable software of the object may include a tool that obtains legitimate credentials to achieve unauthorized access to the one or more servers on the private network. Note that the tool may not be classified as malware and, thus, may not be detectable using traditional malware-based technologies (e.g., signatures). However, in other embodiments, the executable software may be deemed as malicious. The suspicious pattern of accesses may use those legitimate credentials to access the servers on the private network. Some embodiments may determine a destination address of an outbound (i.e., directed toward the public network) communication (i.e., "callback") from an appliance (MDS or DCS) or an endpoint, and determine the first indicator of an attack by ascertaining that the download was received from a source address matching the destination address of the outbound communication. In another embodiment, the download of the object may be detected by an appliance (DCS or MCS) at the first network vantage point, and that appliance may also determine that the object contains malware (i.e., is associated with a maliciousness probability score or level over a first prescribed threshold) or at least is suspicious (i.e., is associated with a maliciousness probability score or level over a second prescribed threshold that is lower than the first prescribed level) resulting from an analysis of the object. If classified as malicious or suspicious, the object may be identifiable within the network and, thus, may be monitored and analyzed at the various network vantage points, including one or more endpoints as well as appliances throughout the network. As such, the first indicator may be determined repeatedly from different nodes at various network vantage points. Instead of seeking to exfiltrate sensitive data from the servers, in one or more other embodiments the executable software may seek to (1) alter the sensitive data, (2) threaten alteration of the sensitive data, (3) encrypt and ransom the sensitive data, and/or (4) covertly tamper with (i.e., modify) the sensitive data.

While there have been shown and described illustrative embodiments detecting lateral movement of an SC-attack in an enterprise network, it is to be understood that various other adaptations and modifications may be made within the spirit and scope of the embodiments herein. For example, embodiments have been shown and described herein with relation to a centralized aggregation technique having an attack analyzer centrally located in the network as a separate appliance configured to detect such lateral movement of the attack. However, the embodiments in their broader sense are not so limited, and may, in fact, provide for the attack analyzer $200_A$ being remotely located and connected for communication, e.g., over a network, to the MDS, DCS and endpoints (cloud based). Moreover, the attack analyzer may be implemented, e.g., in the DCS appliance or in the cloud-based facility.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Moreover, the embodiments or aspects thereof can be implemented in hardware, firmware, software, or a combination thereof. In the foregoing description, for example, in certain situations, terms such as "engine," "component" and "logic" are representative of hardware, firmware and/or software that is configured to perform one or more functions. As hardware, engine (or component/logic) may include circuitry having data processing or storage functionality. Examples of such circuitry may include, but is not limited or restricted to a microprocessor, one or more processor cores, a programmable gate array, a microcontroller, an application specific integrated circuit, semiconductor memory, or combinatorial logic. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method performed by one or more processors of an attack detection appliance located on a private network, comprising:

receiving one or more first indicators of an attack on the private network, the one or more first indicators including results of analyses of content included within information received from a public network that are determined at a first network vantage point being located at a periphery of the private network and the content includes executable software downloaded to a first node located on the private network and configured to operate as one or more software tools;

receiving one or more second indicators of the attack, the one or more second indicators including results of analyses of accesses from the first node to one or more servers on the private network in which the one or more second indicators are determined at a second network vantage point, being a second location within the private network different than the first location;

correlating at least the one or more first indicators and the one or more second indicators to declare the attack has occurred or is in progress on the private network and to track progress of the attack conducted by the one or more software tools of executable software; and performing secondary operations upon detecting the attack during the correlating of at least the first indicator and the second indicator, the secondary operations include at least one of (i) issuing an administrative alert or (ii) limiting or remediating consequences of the attack by invoking protective measures to prevent the attack from continuing or blocking similar attacks from occurring.

2. The method of claim 1 further comprising:
monitoring the attack by receiving a third indicator of the attack from a third vantage point differing from the first and second vantage points.

3. The method of claim 1 wherein the first indicator of the attack is further determined by detecting an outbound communication from the first node, operating as an endpoint, to download the executable software.

4. The method of claim 3, wherein the first indicator of the attack is further determined by detecting that the executable software is received from a source network address that matches a destination public network address of the outbound communication.

5. The method of claim 2 further comprising:
triangulating at least one first indicator from the first vantage point, at least one second indicator from the second vantage point, and at least one third indicator from the third vantage point to detect lateral movement of the attack being conducted in the private network.

6. The method of claim 1 wherein the one or more software tools comprises a reconnaissance software tool that is configured to conduct a mapping of the private network by at least snooping access requests to the one or more servers operating as data center servers or generating network packets to probe the private network including the one or more servers to obtain network addresses and types of data stored at the one or more servers.

7. The method of claim 1 wherein the first network vantage point is located at a periphery of the private network and the second vantage point is located at a data center of the private network including the one or more servers.

8. The method of claim 7 further comprising receiving one or more third indicators of the attack that includes results of analyses of operations of an endpoint device at a third vantage point being located at an endpoint within the private network.

9. The method of claim 8 wherein the third indicator is determined by detecting a second suspicious pattern of accesses emanating from a second node different from the first node.

10. A method performed by an attack analyzer located on a private network comprising:
receiving a first indicator of a stealthy cyber-attack (SC-attack), the first indicator determined by detecting a software tool operating at a first endpoint on the private network and identifying the software tool operating at a first location along the private network, the software tool downloaded from a public network to the private network, the software tool for at least obtaining legitimate credentials for unauthorized access to one or more servers on the private network;
receiving a second indicator of the SC-attack, the second indicator determined at a first appliance on the private network at a location different than the first endpoint by at least detecting a first suspicious pattern of accesses emanating from the first endpoint to the one or more servers and indicating a likelihood of unauthorized use of legitimate credentials, the first suspicious pattern of accesses using the legitimate credentials to access the one or more servers on the private network;
correlating the first indicator and the second indicator to determine a presence of the software tool that is obtaining legitimate credentials for unauthorized access to the one or more servers operating as part of the private network and to detect the SC-attack is in progress on the private network; and
performing secondary operations upon detecting the SC-attack during the correlating of at least the first and second indicators, the secondary operations include at least limiting or remediating consequences of the attack by instructing the first endpoint to invoke protective measures to prevent the attack from continuing or blocking similar attacks from occurring.

11. The method of claim 10 wherein the third indicator is determined at a second appliance on the private network different from the first appliance.

12. The method of claim 10 wherein the first endpoint and first appliance are located in different segments of the private network.

13. The method of claim 10 wherein the second suspicious pattern of accesses different than the first suspicious pattern of accesses.

14. The method of claim 10 wherein the first indicator of the attack is further determined by detecting an outbound communication from the first endpoint to download the software tool.

15. The method of claim 12 wherein the first endpoint is located at a first network segment proximate to a periphery of the private network, and the first appliance is located at a second network segment proximate to a data center of the private network including the one or more servers.

16. The method of claim 12 wherein the second endpoint is located at a network segment different from the first endpoint.

17. The method of claim 10 wherein the first suspicious pattern of accesses includes a plurality of unauthorized mount requests using a file system protocol.

18. The method of claim 10 wherein the first indicator of the attack is further determined by detecting an outbound communication from the first endpoint to download the software tool.

19. A system comprising:
a memory coupled to a network interface, the memory configured to store a one or more processes and modules, the network interface coupled to a private network; and
a processor coupled to the memory and adapted to execute the one or more processes and modules, wherein the one or more processes and modules when executed are operable to:
receive one or more first indicators of a cyber-attack on the private network, the one or more first indicators including results of analyses of content included within information received from a public network that are determined at a first network vantage point being at a first location proximate to a periphery of the private network and types of content include executable software downloaded to a first node on the private network;
receive one or more second indicators of the cyber-attack, the one or more second indicators including results of analyses of accesses from the first node to one or more servers on the private network in which the one or more second indicators are determined at a second network vantage point being a second location within the private network different than the first location;
correlate at least the one or more first indicators and the one or more second indicators to detect the cyber-attack is in progress on the private network and to track progress of the cyber-attack conducted by the executable software; and perform secondary operations upon detecting the cyber-attack during the correlating of at least the first and second indicators, the secondary operations include at least (i) issuing an administrative alert or (ii) limiting or remediating consequences of the cyber-attack by instructing the first node to invoke protective measures to prevent the cyber-attack from continuing or blocking similar cyber-attacks from occurring.

20. The system of claim 19 wherein the first network vantage point is at an endpoint residing within the private network.

21. The system of claim 19 wherein the first network vantage point is located at a first segment of the private network proximate to the periphery and the second vantage point is located at a second segment of the private network different from the first segment.

22. The system of claim 21 wherein the first network segment is at the periphery of the private network and the second network segment is proximate to a data center of the network including the servers.

23. The system of claim 19 wherein the one or more processes and modules when executed are further operable to:

track the cyber-attack by detecting movement of an origin of a first suspicious pattern of access requests.

24. The system of claim 23 wherein detecting the movement of the origin of the suspicious access requests occurs at a third network vantage point different from the first network vantage point.

25. The system of claim 21 wherein the results of the analyses of accesses from the first node to the one or more servers on the private network include a first suspicious pattern of accesses including a number of unauthorized mount requests using a file system protocol, and wherein a number of access requests exceeds a threshold of expected authorized accesses during a time window.

26. The system of claim 25 wherein the first suspicious pattern of accesses originate from the first segment of the private network and from a third network segment.

27. The system of claim 22 wherein one or more processes and modules when executed are further operable to:

instruct an appliance located at the first network vantage point to prevent exfiltration of information.

28. The system of claim 20, wherein the one or more processes and modules, when executed by the processor, are further operable to:

instruct the endpoint located at the first network vantage point to prevent exfiltration of information.

29. The method of claim 10 further comprising:

monitoring the SC-attack by receiving a third indicator of the SC-attack, the third indicator determined by detecting a second suspicious pattern of access emanating from a second endpoint different from the first endpoint, the second suspicious pattern of accesses using the legitimate credentials to access the servers on the private network.

30. The system of claim 19, wherein the one or more processes and modules, when executed by the processor, are further operable to:

monitor the cyber-attack by receiving a third indicator of the attack determined by detecting a suspicious pattern of access requests emanating from a third network vantage point different from the second network vantage point.

31. The method of claim 1, wherein the first node being instructed to invoke the protective measures.

32. The method of claim 1 further comprising receiving one or more third indicators of the attack that includes results of analyses of operations of an endpoint device at a third vantage point being located at the endpoint device.

33. The method of claim 32, wherein the correlating is conducted on the one or more first indicators, the one or more second indicators, and the one or more third indicators to declare the attack is in progress on the private network and to track progress of the attack.

34. The method of claim 32, wherein the correlating is conducted on the one or more first indicators, the one or more second indicators, and the one or more third indicators to generate correlation information including a numerical score representing a probability of the attack occurring on the private network.

35. The method of claim 34, wherein the correlating is conducted on the one or more first indicators, the one or more second indicators, and the one or more third indicators to declare the attack is in progress when the numerical score exceeds a probability threshold.

36. The method of claim 32, wherein the correlating is conducted on the one or more first indicators, the one or more second indicators, and the one or more third indicators to generate correlation information pertaining to a level of risk of the attack occurring on the private network when the level of risk exceeds a probability threshold.

37. The method of claim 32, wherein the correlating is conducted, separately or in any combination, on the one or more first indicators, the one or more second indicators, and the one or more third indicators to generate correlation information including a numerical score or a level or risk representing the attack is occurring on the private network.

38. The method of claim 1, wherein the correlating is conducted, separately or in any combination, on the one or more first indicators and the one or more second indicators to generate correlation information including a numerical score or a level or risk representing the attack is occurring on the private network.

39. The method of claim 1, wherein the second network vantage point being a segment of the private network between the periphery of the private network and the one or more servers.

40. The method of claim 1, wherein the second network vantage point at the one or more servers.

41. The system of claim 19, wherein the one or more processes and modules, when executed, are further operable to receive one or more third indicators of the cyber-attack that includes results of analyses of operations of an endpoint device deployed within the private network at a third vantage point being located at the endpoint device.

42. The system of claim 41, wherein the correlate of at least the one or more first indicators and the one or more second indicators comprises correlating the one or more first indicators, the one or more second indicators, and the one or more third indicators to declare the cyber-attack is in progress on the private network and to track progress of the cyber-attack.

43. The method of claim 41, wherein the correlate of at least the one or more first indicators and the one or more second indicators comprises correlating the one or more first indicators, the one or more second indicators, and the one or more third indicators to generate correlation information including a numerical score representing a probability of the cyber-attack occurring on the private network.

44. The system of claim 43, wherein the correlate of at least the one or more first indicators and the one or more second indicators comprises correlating the one or more first indicators, the one or more second indicators, and the one or more third indicators to declare the cyber-attack is in progress when the numerical score exceeds a probability threshold.

45. The system of claim 41, wherein the correlate of at least the one or more first indicators and the one or more second indicators comprises correlating the one or more first indicators, the one or more second indicators, and the one or more third indicators to generate correlation information pertaining to a level of risk of the cyber-attack occurring on the private network when the level of risk exceeds a probability threshold.

46. The system of claim 41, wherein the correlate of at least the one or more first indicators and the one or more second indicators comprises correlating, separately or in any combination, the one or more first indicators, the one or more second indicators, and the one or more third indicators to generate correlation information including a numerical score or a level or risk representing the cyber-attack is occurring on the private network.

47. The system of claim 19, wherein the second network vantage point being a segment of the private network between the periphery of the private network and the one or more servers.

48. The system of claim 19, wherein the second network vantage point at the one or more servers.

49. The system of claim 19, wherein the one or more processes and modules, when executed, are further operable to triangulate at least one first indicator from the first vantage point, at least one second indicator from the second vantage point, and at least one third indicator from the third vantage point to detect lateral movement of the cyber-attack being conducted in the private network.

50. The system of claim 19, wherein the correlate of at least the one or more first indicators and the one or more second indicators comprises correlating, separately or in any combination, on the one or more first indicators and the one or more second indicators to generate correlation information including a numerical score or a level or risk representing the cyber-attack is occurring on the private network.

* * * * *